United States Patent
Donaho et al.

(10) Patent No.: US 9,058,626 B1
(45) Date of Patent: Jun. 16, 2015

(54) SYSTEM AND METHOD FOR FINANCIAL SERVICES DEVICE USAGE

(71) Applicant: JPMorgan Chase Bank, N.A., New York, NY (US)

(72) Inventors: Emma Donaho, Columbus, OH (US); Joseph Bradley Nolan, New Albany, OH (US); William Budde, Dublin, OH (US); Giancarlo Miranda, Columbus, OH (US); William Scott Sheley, Dublin, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 14/079,091

(22) Filed: Nov. 13, 2013

(51) Int. Cl.
*G06Q 40/02* (2012.01)
*G07D 11/00* (2006.01)
*G07D 13/00* (2006.01)

(52) U.S. Cl.
CPC ............... *G06Q 40/02* (2013.01); *G07D 13/00* (2013.01); *G07D 11/0096* (2013.01); *G07D 2211/00* (2013.01)

(58) Field of Classification Search
CPC .. G06F 7/00; G07D 11/0009; G07D 11/0096; G07D 13/00; G07D 2211/00
USPC ........... 194/215, 216, 350; 209/534; 235/379; 902/9, 10, 12; 700/229; 109/23, 24.1, 109/38, 39; 705/17, 21, 22, 24, 43; 414/403, 411
See application file for complete search history.

(56) References Cited

U.S. PATENT DOCUMENTS

| | | | |
|---|---|---|---|
| 1,985,592 A | 2/1933 | Woodward et al. |
| 2,005,003 A | 6/1935 | Patton et al. |
| 3,653,480 A | 4/1972 | Yamamoto et al. |
| 3,938,090 A | 2/1976 | Borison et al. |
| 4,050,375 A | 9/1977 | Orlens |
| 4,141,078 A | 2/1979 | Bridges et al. |
| 4,205,780 A | 6/1980 | Burns et al. |

(Continued)

FOREIGN PATENT DOCUMENTS

| | | |
|---|---|---|
| EP | 421808 | 4/1991 |
| EP | 0665486 | 8/1995 |

(Continued)

OTHER PUBLICATIONS

Hasting, Nelson et al., A Case Study of Authenticated and Secure File Transfer the Iowa Campaign Finance Reporting System.

(Continued)

*Primary Examiner* — Mark Beauchaine
(74) *Attorney, Agent, or Firm* — Hunton & Williams LLP

(57) ABSTRACT

An intelligent process is provided for a business to interface with a financial institution. A container is provided that is capable of interfacing with a financial transaction device. The container may have one or more internal compartments sized to accommodate cash, coins, and/or checks. The container may be available in a variety of sizes. The container is capable of being sealed and locked in a tamper proof manner. A tracking device may be included with the container. The container may contain a computing device. The container may then be taken to a designated location having a financial transaction device with which the container can interface. The financial transaction device may be located at a branch of a financial institution or another location, such as at the business itself or at another location.

30 Claims, 7 Drawing Sheets

(56) References Cited

U.S. PATENT DOCUMENTS

| | | | |
|---|---|---|---|
| 4,223,403 A | 9/1980 | Konheim et al. | |
| 4,264,808 A | 4/1981 | Owens et al. | |
| 4,319,336 A | 3/1982 | Anderson et al. | |
| 4,321,672 A | 3/1982 | Braun et al. | |
| 4,385,285 A | 5/1983 | Horst et al. | |
| 4,396,985 A | 8/1983 | Ohara | |
| 4,443,027 A | 4/1984 | McNeely et al. | |
| 4,453,074 A | 6/1984 | Weinstein | |
| 4,454,414 A | 6/1984 | Benton | |
| RE31,692 E | 10/1984 | Tyburski et al. | |
| 4,495,018 A | 1/1985 | Vohrer | |
| 4,575,621 A | 3/1986 | Dreifus | |
| 4,605,820 A | 8/1986 | Campbell, Jr. | |
| 4,605,844 A | 8/1986 | Haggan | |
| 4,614,861 A | 9/1986 | Pavlov et al. | |
| 4,617,457 A | 10/1986 | Myers | |
| 4,634,845 A | 1/1987 | Hale et al. | |
| 4,641,239 A | 2/1987 | Takesako | |
| 4,650,981 A | 3/1987 | Foletta | |
| 4,661,658 A | 4/1987 | Matyas | |
| 4,662,621 A * | 5/1987 | Lundblad | 271/3.19 |
| 4,669,730 A | 6/1987 | Small | |
| 4,672,377 A | 6/1987 | Murphy | |
| 4,694,397 A | 9/1987 | Grant et al. | |
| 4,697,072 A | 9/1987 | Kawana | |
| 4,700,055 A | 10/1987 | Kashkashian, Jr. | |
| 4,701,601 A | 10/1987 | Francini et al. | |
| 4,713,760 A | 12/1987 | Yamada et al. | |
| 4,713,761 A | 12/1987 | Sharpe et al. | |
| 4,752,676 A | 6/1988 | Leonard et al. | |
| 4,752,877 A | 6/1988 | Roberts et al. | |
| 4,797,913 A | 1/1989 | Kaplan | |
| 4,799,156 A | 1/1989 | Shavit | |
| 4,807,177 A | 2/1989 | Ward | |
| 4,812,628 A | 3/1989 | Boston et al. | |
| 4,817,949 A | 4/1989 | Bachman et al. | |
| 4,823,264 A | 4/1989 | Deming | |
| 4,845,347 A | 7/1989 | McCrindle | |
| 4,859,837 A | 8/1989 | Halpern | |
| 4,877,847 A | 10/1989 | Masu et al. | |
| 4,891,503 A | 1/1990 | Jewell | |
| 4,893,333 A | 1/1990 | Baran et al. | |
| 4,931,793 A | 6/1990 | Fuhrmann et al. | |
| 4,939,674 A | 7/1990 | Price et al. | |
| 4,948,174 A | 8/1990 | Thomson et al. | |
| 4,974,878 A | 12/1990 | Josephson | |
| 4,975,841 A | 12/1990 | Kehnemuyi et al. | |
| 4,977,501 A | 12/1990 | Lefevre | |
| 4,988,849 A | 1/1991 | Sasaki | |
| 4,992,646 A | 2/1991 | Collin | |
| 4,992,940 A | 2/1991 | Dworkin | |
| 5,007,084 A | 4/1991 | Materna et al. | |
| 5,023,782 A | 6/1991 | Lutz et al. | |
| 5,023,904 A | 6/1991 | Kaplan | |
| 5,025,139 A | 6/1991 | Halliburton, Jr. | |
| 5,053,607 A | 10/1991 | Carlson | |
| 5,054,096 A | 10/1991 | Beizer | |
| 5,072,380 A | 12/1991 | Randelman et al. | |
| 5,080,748 A | 1/1992 | Bonomi | |
| 5,097,115 A | 3/1992 | Ogasawara et al. | |
| 5,111,395 A | 5/1992 | Smith | |
| 5,121,945 A | 6/1992 | Thomson et al. | |
| 5,122,950 A | 6/1992 | Mee | |
| 5,136,502 A | 8/1992 | Van Remortel et al. | |
| 5,173,851 A | 12/1992 | Off et al. | |
| 5,175,682 A | 12/1992 | Higashiyama | |
| 5,187,750 A | 2/1993 | Behera | |
| 5,198,975 A | 3/1993 | Baker et al. | |
| 5,220,501 A | 6/1993 | Lawlor | |
| 5,224,034 A | 6/1993 | Katz et al. | |
| 5,225,978 A | 7/1993 | Petersen | |
| 5,231,569 A | 7/1993 | Myatt et al. | |
| 5,237,159 A | 8/1993 | Stephens | |
| 5,237,620 A | 8/1993 | Deaton | |
| 5,257,486 A | 11/1993 | Holmwall | |
| 5,265,007 A | 11/1993 | Barnhard, Jr. et al. | |
| 5,265,008 A | 11/1993 | Benton et al. | |
| 5,276,311 A | 1/1994 | Hennige | |
| 5,283,829 A | 2/1994 | Anderson | |
| 5,287,269 A | 2/1994 | Dorrough et al. | |
| 5,305,196 A | 4/1994 | Deaton et al. | |
| 5,311,594 A | 5/1994 | Penzias | |
| 5,315,508 A | 5/1994 | Bain et al. | |
| 5,321,238 A | 6/1994 | Watanabe | |
| 5,326,959 A | 7/1994 | Perazza | |
| 5,326,960 A | 7/1994 | Tannenbaum | |
| 5,326,964 A | 7/1994 | Risser | |
| 5,327,508 A | 7/1994 | Deaton et al. | |
| 5,336,870 A | 8/1994 | Hughes | |
| 5,349,170 A | 9/1994 | Kern | |
| 5,350,906 A | 9/1994 | Brody et al. | |
| 5,351,187 A | 9/1994 | Hassett | |
| 5,352,877 A | 10/1994 | Morley | |
| 5,367,581 A | 11/1994 | Vanhorn | |
| 5,372,386 A | 12/1994 | Mills | |
| 5,373,550 A | 12/1994 | Campbell | |
| 5,382,784 A | 1/1995 | Eberhardt | |
| 5,396,417 A | 3/1995 | Burks | |
| 5,402,474 A | 3/1995 | Miller | |
| 5,412,190 A | 5/1995 | Kopesec | |
| 5,413,341 A | 5/1995 | Lieberman | |
| 5,424,938 A | 6/1995 | Wagner | |
| 5,428,684 A | 6/1995 | Akiyama et al. | |
| 5,430,644 A | 7/1995 | Deaton et al. | |
| 5,432,506 A | 7/1995 | Chapman | |
| 5,444,794 A | 8/1995 | Uhland | |
| 5,444,841 A | 8/1995 | Glaser et al. | |
| 5,446,740 A | 8/1995 | Yien | |
| 5,448,471 A | 9/1995 | Deaton et al. | |
| 5,453,601 A | 9/1995 | Rosen | |
| 5,455,407 A | 10/1995 | Rosen | |
| 5,459,482 A | 10/1995 | Orlen | |
| 5,465,206 A | 11/1995 | Hilt et al. | |
| 5,477,040 A | 12/1995 | Lalonde | |
| 5,479,494 A | 12/1995 | Clitherow | |
| 5,481,094 A | 1/1996 | Suda | |
| 5,483,445 A | 1/1996 | Pickering | |
| 5,484,988 A | 1/1996 | Hills | |
| 5,487,100 A | 1/1996 | Kane | |
| 5,495,981 A | 3/1996 | Warther | |
| 5,500,890 A | 3/1996 | Rogge et al. | |
| 5,502,576 A | 3/1996 | Ramsay et al. | |
| 5,504,677 A | 4/1996 | Pollin | |
| 5,506,691 A | 4/1996 | Bednar et al. | |
| 5,508,731 A | 4/1996 | Kohorn | |
| 5,513,117 A | 4/1996 | Small | |
| 5,513,250 A | 4/1996 | McAllister | |
| 5,530,907 A | 6/1996 | Pavey et al. | |
| 5,532,464 A | 7/1996 | Josephson et al. | |
| 5,532,689 A | 7/1996 | Bueno | |
| 5,539,825 A | 7/1996 | Akiyama et al. | |
| 5,541,583 A | 7/1996 | Mandelbaum | |
| 5,544,043 A | 8/1996 | Miki et al. | |
| 5,544,046 A | 8/1996 | Niwa | |
| 5,550,734 A | 8/1996 | Tarter | |
| 5,551,021 A | 8/1996 | Harada | |
| 5,557,515 A | 9/1996 | Abbruzzese et al. | |
| 5,563,400 A | 10/1996 | Le Roux | |
| 5,566,330 A | 10/1996 | Sheffield | |
| 5,568,489 A | 10/1996 | Yien | |
| 5,570,465 A | 10/1996 | Tsakanikas | |
| 5,572,004 A | 11/1996 | Raimann | |
| 5,583,759 A | 12/1996 | Geer | |
| 5,583,760 A | 12/1996 | Klesse | |
| 5,590,196 A | 12/1996 | Moreau | |
| 5,590,197 A | 12/1996 | Chen | |
| 5,592,377 A | 1/1997 | Lipkin | |
| 5,592,378 A | 1/1997 | Cameron | |
| 5,599,528 A | 2/1997 | Igaki | |
| 5,602,936 A | 2/1997 | Green et al. | |
| 5,603,025 A | 2/1997 | Tabb | |
| 5,612,868 A | 3/1997 | Off et al. | |
| 5,615,109 A | 3/1997 | Eder | |
| 5,615,277 A | 3/1997 | Hoffman | |

(56) References Cited

U.S. PATENT DOCUMENTS

| | | |
|---|---|---|
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,727 A | 7/1997 | Atkins |
| 5,644,778 A | 7/1997 | Burks et al. |
| 5,649,114 A | 7/1997 | Deaton et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,668,953 A | 9/1997 | Sloo |
| 5,669,528 A | 9/1997 | Romero et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,689,593 A | 11/1997 | Pan et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,868 A | 2/1998 | James |
| 5,717,989 A | 2/1998 | Tozzoli et al. |
| 5,724,424 A | 3/1998 | Gifford |
| 5,727,153 A | 3/1998 | Powell |
| 5,729,594 A | 3/1998 | Klingman |
| 5,744,787 A | 4/1998 | Teicher |
| 5,748,780 A | 5/1998 | Stolfo |
| 5,751,842 A | 5/1998 | Eccles |
| 5,757,917 A | 5/1998 | Rose et al. |
| 5,764,789 A | 6/1998 | Pare, Jr. et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikoff |
| 5,787,403 A | 7/1998 | Randle |
| 5,788,285 A | 8/1998 | Wicker |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |
| 5,802,498 A | 9/1998 | Comesanas |
| 5,802,499 A | 9/1998 | Sampson et al. |
| 5,805,719 A | 9/1998 | Pare, Jr. et al. |
| 5,812,988 A | 9/1998 | Sandretto |
| 5,819,236 A | 10/1998 | Josephson |
| 5,819,238 A | 10/1998 | Fernholz |
| 5,823,463 A | 10/1998 | Fissmann et al. |
| 5,825,003 A | 10/1998 | Jennings et al. |
| 5,826,241 A | 10/1998 | Stein |
| 5,826,245 A | 10/1998 | Sandberg-Diment |
| 5,826,247 A | 10/1998 | Pintsov et al. |
| 5,832,090 A | 11/1998 | Raspotnik |
| 5,832,447 A | 11/1998 | Rieker |
| 5,832,457 A | 11/1998 | O'Brien |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,838,812 A | 11/1998 | Pare, Jr. et al. |
| 5,842,421 A | 12/1998 | Desilets et al. |
| 5,852,811 A | 12/1998 | Atkins |
| 5,852,812 A | 12/1998 | Reeder |
| 5,859,419 A | 1/1999 | Wynn |
| 5,864,609 A | 1/1999 | Cross et al. |
| 5,864,830 A | 1/1999 | Armetta et al. |
| 5,870,456 A | 2/1999 | Rogers |
| 5,870,721 A | 2/1999 | Norris |
| 5,870,723 A | 2/1999 | Pare |
| 5,870,724 A | 2/1999 | Lawlor et al. |
| 5,870,725 A | 2/1999 | Bellinger et al. |
| 5,873,072 A | 2/1999 | Kight |
| 5,875,437 A | 2/1999 | Atkins |
| 5,878,141 A | 3/1999 | Daly et al. |
| 5,883,337 A | 3/1999 | Dolan et al. |
| 5,883,377 A | 3/1999 | Chapin, Jr. |
| 5,883,810 A | 3/1999 | Franklin et al. |
| 5,884,274 A | 3/1999 | Walker et al. |
| 5,884,288 A | 3/1999 | Chang |
| 5,884,290 A | 3/1999 | Smorodinsky et al. |
| 5,889,863 A | 3/1999 | Weber |
| 5,893,080 A | 4/1999 | McGurl et al. |
| 5,897,625 A | 4/1999 | Gustin |
| 5,898,157 A | 4/1999 | Mangili et al. |
| 5,898,838 A | 4/1999 | Wagner |
| 5,903,881 A | 5/1999 | Schrader |
| 5,907,142 A | 5/1999 | Kelsey |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,926,745 A | 7/1999 | Threadgill et al. |
| 5,928,082 A | 7/1999 | Clapper |
| 5,930,778 A | 7/1999 | Geer |
| 5,933,812 A | 8/1999 | Meyer et al. |
| 5,940,510 A | 8/1999 | Curry et al. |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,949,044 A | 9/1999 | Walker et al. |
| 5,950,174 A | 9/1999 | Brendzel |
| 5,956,700 A | 9/1999 | Landry |
| 5,960,411 A | 9/1999 | Hartman et al. |
| 5,963,647 A | 10/1999 | Downing et al. |
| 5,963,659 A | 10/1999 | Cahill et al. |
| 5,963,925 A | 10/1999 | Kolling et al. |
| 5,966,698 A | 10/1999 | Pollin |
| 5,970,469 A | 10/1999 | Scroggie et al. |
| 5,970,475 A | 10/1999 | Barnes et al. |
| 5,978,780 A | 11/1999 | Watson |
| 5,987,434 A | 11/1999 | Libman |
| 5,987,435 A | 11/1999 | Weiss et al. |
| 5,987,436 A | 11/1999 | Halbrook |
| 5,987,439 A | 11/1999 | Gustin et al. |
| 5,991,749 A | 11/1999 | Morrill, Jr. |
| 5,991,750 A | 11/1999 | Watson |
| 6,000,832 A | 12/1999 | Franklin et al. |
| 6,002,767 A | 12/1999 | Kramer |
| 6,003,762 A | 12/1999 | Hayashida |
| 6,006,084 A | 12/1999 | Miller et al. |
| 6,006,205 A | 12/1999 | Loeb et al. |
| 6,006,208 A | 12/1999 | Forst et al. |
| 6,009,442 A | 12/1999 | Chen et al. |
| 6,012,049 A | 1/2000 | Kawan |
| 6,014,634 A | 1/2000 | Scroggie et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,021,202 A | 2/2000 | Anderson et al. |
| 6,026,388 A | 2/2000 | Liddy et al. |
| 6,029,139 A | 2/2000 | Cunningham et al. |

(56) References Cited

U.S. PATENT DOCUMENTS

| | | |
|---|---|---|
| 6,029,141 A | 2/2000 | Bezos et al. |
| 6,029,153 A | 2/2000 | Bauchner et al. |
| 6,032,133 A | 2/2000 | Hilt et al. |
| 6,032,134 A | 2/2000 | Weissman |
| 6,032,136 A | 2/2000 | Brake, Jr. et al. |
| 6,032,137 A | 2/2000 | Hallard |
| 6,032,257 A | 2/2000 | Olarig et al. |
| 6,032,859 A | 3/2000 | Muehlberger et al. |
| 6,035,281 A | 3/2000 | Crosskey et al. |
| 6,035,285 A | 3/2000 | Schlect et al. |
| 6,035,287 A | 3/2000 | Stallaert et al. |
| 6,036,099 A | 3/2000 | Leighton |
| 6,038,553 A | 3/2000 | Hyde, Jr. |
| 6,039,249 A | 3/2000 | Szewezykowski |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,048,271 A | 4/2000 | Barcelou |
| 6,052,674 A | 4/2000 | Zervides et al. |
| 6,058,307 A | 5/2000 | Garner |
| 6,058,379 A | 5/2000 | Odom et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,091,362 A | 7/2000 | Stilp et al. |
| 6,092,056 A | 7/2000 | Tull, Jr. et al. |
| 6,092,057 A | 7/2000 | Zimmermann et al. |
| 6,098,053 A | 8/2000 | Slater |
| 6,098,070 A | 8/2000 | Maxwell |
| 6,100,120 A | 8/2000 | Yu |
| 6,101,479 A | 8/2000 | Shaw |
| 6,105,006 A | 8/2000 | Davis et al. |
| 6,105,007 A | 8/2000 | Norris |
| 6,105,011 A | 8/2000 | Morrison, Jr. |
| 6,108,639 A | 8/2000 | Walker et al. |
| 6,108,641 A | 8/2000 | Kenna et al. |
| 6,108,642 A | 8/2000 | Findley |
| 6,110,044 A | 8/2000 | Stern |
| 6,111,858 A | 8/2000 | Greaves et al. |
| 6,112,085 A | 8/2000 | Garner et al. |
| 6,115,690 A | 9/2000 | Wong |
| 6,119,011 A | 9/2000 | Borst et al. |
| 6,119,106 A | 9/2000 | Mersky et al. |
| 6,119,107 A | 9/2000 | Polk |
| 6,125,354 A | 9/2000 | MacFarlane et al. |
| 6,125,391 A | 9/2000 | Meltzer et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,138,917 A | 10/2000 | Chapin, Jr. |
| 6,141,666 A | 10/2000 | Tobin |
| 6,144,726 A | 11/2000 | Cross |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,164,528 A | 12/2000 | Hills et al. |
| 6,169,974 B1 | 1/2001 | Baumgartner et al. |
| 6,173,272 B1 | 1/2001 | Thomas et al. |
| 6,178,409 B1 | 1/2001 | Weber et al. |
| 6,181,837 B1 | 1/2001 | Cahill et al. |
| 6,182,059 B1 | 1/2001 | Angotti et al. |
| 6,185,541 B1 | 2/2001 | Scroggie et al. |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,369 B1 | 5/2001 | Foust |
| 6,240,444 B1 | 5/2001 | Fin et al. |
| 6,243,580 B1 | 6/2001 | Garner |
| 6,243,689 B1 | 6/2001 | Norton |
| 6,247,000 B1 | 6/2001 | Hawkins et al. |
| 6,267,292 B1 | 7/2001 | Walker et al. |
| 6,278,981 B1 | 8/2001 | Dembo et al. |
| 6,278,996 B1 | 8/2001 | Richardson et al. |
| 6,279,158 B1 | 8/2001 | Geile et al. |
| 6,282,516 B1 | 8/2001 | Giuliani |
| 6,283,366 B1 | 9/2001 | Hills et al. |
| 6,285,777 B2 | 9/2001 | Kanevsky et al. |
| 6,289,322 B1 | 9/2001 | Kitchen et al. |
| 6,289,324 B1 | 9/2001 | Kawan |
| 6,292,789 B1 | 9/2001 | Schutzer |
| 6,298,335 B1 | 10/2001 | Bernstein |
| 6,301,379 B1 | 10/2001 | Thompson et al. |
| 6,301,567 B1 | 10/2001 | Leong et al. |
| 6,304,858 B1 | 10/2001 | Mosler et al. |
| 6,305,603 B1 | 10/2001 | Grunbok, Jr. et al. |
| 6,308,887 B1 | 10/2001 | Korman et al. |
| 6,318,536 B1 | 11/2001 | Korman et al. |
| 6,321,212 B1 | 11/2001 | Lange |
| 6,324,524 B1 | 11/2001 | Lent et al. |
| 6,327,575 B1 | 12/2001 | Katz |
| 6,332,126 B1 | 12/2001 | Peirce et al. |
| 6,332,163 B1 | 12/2001 | Bowman-Amuah |
| 6,334,108 B1 | 12/2001 | Deaton et al. |
| 6,336,103 B1 | 1/2002 | Baker |
| 6,338,047 B1 | 1/2002 | Wallman |
| 6,338,049 B1 | 1/2002 | Walker et al. |
| 6,341,724 B2 | 1/2002 | Campisano |
| 6,343,279 B1 | 1/2002 | Bissonette et al. |
| 6,344,108 B1 | 2/2002 | Von Medvey et al. |
| 6,349,290 B1 | 2/2002 | Horowitz et al. |
| 6,349,972 B1 | 2/2002 | Geiger et al. |
| 6,351,735 B1 | 2/2002 | Deaton et al. |
| 6,354,491 B2 | 3/2002 | Nichols et al. |
| 6,356,881 B1 | 3/2002 | Milch et al. |
| 6,360,209 B1 | 3/2002 | Loeb et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,377,935 B1 | 4/2002 | Deaton et al. |
| 6,390,362 B1 | 5/2002 | Martin |
| 6,393,409 B2 | 5/2002 | Young et al. |
| 6,404,866 B1 | 6/2002 | Hopper et al. |
| 6,405,173 B1 | 6/2002 | Honarvar et al. |
| 6,405,181 B2 | 6/2002 | Lent et al. |
| 6,409,593 B1 | 6/2002 | Petrecca |
| 6,411,806 B1 | 6/2002 | Garner et al. |
| 6,411,942 B1 | 6/2002 | Fujimoto |
| 6,411,947 B1 | 6/2002 | Rice et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,947 B1 | 7/2002 | Tsuria et al. |
| 6,424,949 B1 | 7/2002 | Deaton et al. |

(56) References Cited

U.S. PATENT DOCUMENTS

| | | |
|---|---|---|
| 6,434,159 B1 | 8/2002 | Woodward et al. |
| 6,434,534 B1 | 8/2002 | Walker et al. |
| 6,438,594 B1 | 8/2002 | Bowman-Amuah |
| 6,442,748 B1 | 8/2002 | Bowman-Amuah |
| 6,446,072 B1 | 9/2002 | Schulze et al. |
| 6,454,647 B1 | 9/2002 | Woodbury, Jr. |
| 6,456,981 B1 | 9/2002 | Dejaeger et al. |
| 6,460,020 B1 | 10/2002 | Pool et al. |
| 6,464,134 B1 | 10/2002 | Page |
| 6,477,580 B1 | 11/2002 | Bowman-Amuah |
| 6,485,922 B1 | 11/2002 | Erickson et al. |
| 6,490,568 B1 | 12/2002 | O'Mara et al. |
| 6,493,685 B1 | 12/2002 | Ensel et al. |
| 6,494,367 B1 | 12/2002 | Zacharias |
| 6,495,437 B1 | 12/2002 | Yu |
| 6,513,019 B2 | 1/2003 | Lewis |
| 6,516,302 B1 | 2/2003 | Deaton et al. |
| 6,535,896 B2 | 3/2003 | Britton et al. |
| 6,536,663 B1 | 3/2003 | Lozier et al. |
| 6,542,739 B1 | 4/2003 | Garner |
| 6,547,129 B2 | 4/2003 | Nichols et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,571,282 B1 | 5/2003 | Bowman-Amuah |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,578,068 B1 | 6/2003 | Bowman-Amuah |
| 6,578,761 B1 | 6/2003 | Spector |
| 6,607,127 B2 | 8/2003 | Wong |
| 6,609,104 B1 | 8/2003 | Deaton et al. |
| 6,609,113 B1 | 8/2003 | O'Leary et al. |
| 6,609,125 B1 | 8/2003 | Layne et al. |
| 6,611,811 B1 | 8/2003 | Deaton et al. |
| 6,611,819 B1 | 8/2003 | Oneda |
| 6,615,189 B1 | 9/2003 | Phillips et al. |
| 6,629,081 B1 | 9/2003 | Cornelius et al. |
| 6,636,615 B1 | 10/2003 | Rhoads et al. |
| 6,640,238 B1 | 10/2003 | Bowman-Amuah |
| 6,640,249 B1 | 10/2003 | Bowman-Amuah |
| 6,647,376 B1 | 11/2003 | Farrar et al. |
| 6,658,393 B1 | 12/2003 | Basch et al. |
| 6,659,259 B2 | 12/2003 | Knox et al. |
| 6,661,910 B2 | 12/2003 | Jones et al. |
| 6,662,215 B1 | 12/2003 | Moskowitz et al. |
| 6,684,195 B1 | 1/2004 | Deaton et al. |
| 6,687,684 B1 | 2/2004 | Whitehouse et al. |
| 6,704,714 B1 | 3/2004 | O'Leary et al. |
| 6,714,919 B1 | 3/2004 | Findley |
| 6,718,313 B1 | 4/2004 | Lent et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| 6,749,122 B1 | 6/2004 | Koenck et al. |
| 6,754,640 B2 | 6/2004 | Bozeman |
| 6,769,605 B1 | 8/2004 | Magness |
| 6,776,332 B2 | 8/2004 | Allen et al. |
| D496,365 S | 9/2004 | Liu et al. |
| 6,795,809 B2 | 9/2004 | O'Brien et al. |
| 6,795,812 B1 | 9/2004 | Lent et al. |
| 6,796,490 B1 | 9/2004 | Drummond et al. |
| 6,804,786 B1 | 10/2004 | Chamley et al. |
| 6,805,287 B2 | 10/2004 | Bishop et al. |
| 6,805,289 B2 | 10/2004 | Noriega et al. |
| 6,806,145 B2 | 10/2004 | Haukka et al. |
| D498,236 S | 11/2004 | Liu et al. |
| 6,817,008 B2 | 11/2004 | Ledford et al. |
| 6,817,521 B1 | 11/2004 | Matada |
| 6,820,058 B2 | 11/2004 | Wood et al. |
| 6,824,066 B2 | 11/2004 | Weyant |
| 6,825,940 B1 | 11/2004 | Wu et al. |
| 6,826,542 B1 | 11/2004 | Virgin |
| 6,834,344 B1 | 12/2004 | Aggarwal et al. |
| 6,856,973 B1 | 2/2005 | Bott |
| RE38,717 E | 3/2005 | Bothwell |
| 6,860,375 B2 | 3/2005 | Hallowell et al. |
| 6,865,547 B1 | 3/2005 | Brake, Jr. et al. |
| 6,874,139 B2 | 3/2005 | Krueger et al. |
| 6,885,994 B1 | 4/2005 | Scroggie et al. |
| 6,886,046 B2 | 4/2005 | Stutz et al. |
| 6,892,187 B2 | 5/2005 | Phillips et al. |
| 6,901,406 B2 | 5/2005 | Nabe et al. |
| 6,912,502 B1 | 6/2005 | Buddle et al. |
| 6,938,156 B2 | 8/2005 | Wheeler et al. |
| RE38,801 E | 9/2005 | Rogers |
| 6,942,569 B2 | 9/2005 | Petracca |
| 6,945,453 B1 | 9/2005 | Schwarz Jr. |
| 6,950,881 B1 | 9/2005 | Ndili |
| 6,950,940 B2 | 9/2005 | Wheeler et al. |
| 6,954,896 B1 | 10/2005 | Dodrill et al. |
| 6,961,710 B1 | 11/2005 | Yanagisawa et al. |
| 6,963,857 B1 | 11/2005 | Johnson |
| 6,965,868 B1 | 11/2005 | Bednarek |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| 6,980,970 B2 | 12/2005 | Krueger et al. |
| RE38,957 E | 1/2006 | Laussermair et al. |
| 6,991,157 B2 | 1/2006 | Bishop et al. |
| 6,999,938 B1 | 2/2006 | Libman |
| 6,999,943 B1 | 2/2006 | Johnson et al. |
| 7,003,476 B1 | 2/2006 | Samra et al. |
| 7,004,382 B2 | 2/2006 | Sandru |
| 7,006,979 B1 | 2/2006 | Samra et al. |
| 7,010,495 B1 | 3/2006 | Samra et al. |
| 7,010,512 B1 | 3/2006 | Gillin et al. |
| 7,014,110 B2 | 3/2006 | Minowa et al. |
| 7,024,374 B1 | 4/2006 | Day et al. |
| 7,024,385 B1 | 4/2006 | Adcock et al. |
| 7,025,256 B1 | 4/2006 | Drummond et al. |
| 7,039,600 B1 | 5/2006 | Meek et al. |
| 7,040,533 B1 | 5/2006 | Ramachandran |
| 7,050,996 B1 | 5/2006 | Blagg et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,070,112 B2 | 7/2006 | Beenau et al. |
| 7,072,864 B2 | 7/2006 | Brake, Jr. et al. |
| 7,076,458 B2 | 7/2006 | Lawlor et al. |
| 7,076,465 B1 | 7/2006 | Blagg et al. |
| 7,080,036 B1 | 7/2006 | Drummond et al. |
| 7,092,905 B2 | 8/2006 | Behrenbrinker et al. |
| 7,096,003 B2 | 8/2006 | Joao et al. |
| 7,104,443 B1 | 9/2006 | Paul et al. |
| 7,119,659 B2 | 10/2006 | Bonalle et al. |
| 7,121,471 B2 | 10/2006 | Beenau et al. |
| 7,133,846 B1 | 11/2006 | Ginter et al. |
| 7,143,063 B2 | 11/2006 | Lent et al. |
| 7,146,344 B2 | 12/2006 | Wankmueller |
| 7,150,393 B1 | 12/2006 | Drummond et al. |
| 7,155,409 B1 | 12/2006 | Stroh |
| 7,159,116 B2 | 1/2007 | Moskowitz |
| 7,177,836 B1 | 2/2007 | German et al. |
| 7,188,089 B2 | 3/2007 | Goldthwaite et al. |
| 7,194,437 B1 | 3/2007 | Britto et al. |
| 7,200,255 B2 | 4/2007 | Jones et al. |
| 7,225,249 B1 | 5/2007 | Barry et al. |
| 7,228,155 B2 | 6/2007 | Saunders |
| 7,249,092 B2 | 7/2007 | Dunn et al. |
| 7,249,112 B2 | 7/2007 | Berardi et al. |
| 7,266,511 B2 | 9/2007 | Teshima |
| 7,269,575 B1 | 9/2007 | Concannon et al. |
| 7,277,870 B2 | 10/2007 | Mourad et al. |
| 7,287,009 B1 | 10/2007 | Liebermann |
| 7,308,426 B1 | 12/2007 | Pitroda |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |

(56) References Cited

U.S. PATENT DOCUMENTS

| | | | |
|---|---|---|---|
| 7,349,884 B1 | 3/2008 | Odom et al. | |
| RE40,220 E | 4/2008 | Nichols et al. | |
| 7,356,516 B2 | 4/2008 | Richey et al. | |
| 7,360,693 B1 | 4/2008 | Sullivan | |
| 7,379,896 B1 | 5/2008 | Meek et al. | |
| 7,380,707 B1 | 6/2008 | Fredman | |
| 7,398,253 B1 | 7/2008 | Pinnell | |
| 7,401,048 B2 | 7/2008 | Rosedale | |
| 7,401,049 B2 | 7/2008 | Hobbs et al. | |
| 7,401,731 B1 | 7/2008 | Pletz et al. | |
| 7,471,818 B1 | 12/2008 | Price et al. | |
| 7,493,288 B2 | 2/2009 | Biship et al. | |
| 7,506,804 B2 | 3/2009 | Zajkowski et al. | |
| 7,512,551 B2 | 3/2009 | Postrel | |
| 7,523,385 B2 | 4/2009 | Nguyen et al. | |
| 7,536,354 B1 | 5/2009 | DeGroeve et al. | |
| 7,546,272 B2 | 6/2009 | Loy | |
| 7,571,142 B1 | 8/2009 | Flitcroft et al. | |
| 7,577,611 B2 | 8/2009 | Heit et al. | |
| 7,584,153 B2 | 9/2009 | Brown et al. | |
| 7,587,363 B2 | 9/2009 | Cataline et al. | |
| 7,607,583 B2 | 10/2009 | Berardi et al. | |
| 7,640,205 B2 | 12/2009 | Michelassi et al. | |
| 7,647,344 B2 | 1/2010 | Skurtovich, Jr. et al. | |
| 7,676,409 B1 | 3/2010 | Ahmad | |
| 7,680,735 B1 | 3/2010 | Loy | |
| 7,686,218 B2 | 3/2010 | Hessburg et al. | |
| 7,698,398 B1 | 4/2010 | Lai | |
| 7,707,111 B2 | 4/2010 | Brake, Jr. et al. | |
| 7,734,545 B1 | 6/2010 | Fogliano et al. | |
| 7,743,979 B2 | 6/2010 | Fredman | |
| 7,747,522 B1 | 6/2010 | Walker et al. | |
| 7,748,614 B2 | 7/2010 | Brown | |
| 7,814,016 B2 | 10/2010 | Pranger | |
| 7,822,684 B2 | 10/2010 | Rielly et al. | |
| 7,860,789 B2 | 12/2010 | Hirka et al. | |
| 7,882,684 B2 | 2/2011 | Anzini et al. | |
| 7,890,422 B1 | 2/2011 | Hirka et al. | |
| 8,141,772 B1 * | 3/2012 | Folk et al. | 235/379 |
| 8,177,132 B1 * | 5/2012 | Bohen et al. | 235/385 |
| 8,616,360 B2 * | 12/2013 | Bergeron et al. | 194/350 |
| 2001/0011222 A1 | 8/2001 | McLauchlin et al. | |
| 2001/0018666 A1 | 8/2001 | Sugiyama et al. | |
| 2001/0018739 A1 | 8/2001 | Anderson et al. | |
| 2001/0023415 A1 | 9/2001 | Keil | |
| 2001/0027441 A1 | 10/2001 | Wankmueller | |
| 2001/0029490 A1 | 10/2001 | Inamochi | |
| 2001/0032139 A1 | 10/2001 | Debonnett, Jr. | |
| 2001/0034663 A1 | 10/2001 | Teveler et al. | |
| 2001/0034718 A1 | 10/2001 | Shaked et al. | |
| 2001/0037299 A1 | 11/2001 | Nichols et al. | |
| 2001/0037300 A1 | 11/2001 | Miyazaki et al. | |
| 2001/0037309 A1 | 11/2001 | Vrain | |
| 2001/0038033 A1 | 11/2001 | Habib | |
| 2001/0044747 A1 | 11/2001 | Ramachandran et al. | |
| 2001/0044764 A1 | 11/2001 | Arnold | |
| 2001/0047322 A1 | 11/2001 | Plate | |
| 2001/0047334 A1 | 11/2001 | Nappe et al. | |
| 2001/0047489 A1 | 11/2001 | Ito et al. | |
| 2001/0051533 A1 | 12/2001 | Wietzke et al. | |
| 2001/0051919 A1 | 12/2001 | Mason | |
| 2002/0002513 A1 | 1/2002 | Chiasson | |
| 2002/0012445 A1 | 1/2002 | Perry | |
| 2002/0013728 A1 | 1/2002 | Wilkman | |
| 2002/0023055 A1 | 2/2002 | Antognini et al. | |
| 2002/0026365 A1 | 2/2002 | Natanzon | |
| 2002/0026394 A1 | 2/2002 | Savage et al. | |
| 2002/0032651 A1 | 3/2002 | Embrey | |
| 2002/0038363 A1 | 3/2002 | MacLean | |
| 2002/0046106 A1 | 4/2002 | Ishibashi et al. | |
| 2002/0046169 A1 | 4/2002 | Keresman et al. | |
| 2002/0047316 A1 | 4/2002 | Chitayat | |
| 2002/0049605 A1 | 4/2002 | Hagi | |
| 2002/0052842 A1 | 5/2002 | Schuba et al. | |
| 2002/0052845 A1 | 5/2002 | Nielsen | |
| 2002/0055907 A1 | 5/2002 | Pater et al. | |
| 2002/0059103 A1 | 5/2002 | Anderson et al. | |
| 2002/0059139 A1 | 5/2002 | Evans | |
| 2002/0062257 A1 | 5/2002 | Minamishin et al. | |
| 2002/0069134 A1 | 6/2002 | Solomon | |
| 2002/0069158 A1 | 6/2002 | Larkin et al. | |
| 2002/0072976 A1 | 6/2002 | Virtanen et al. | |
| 2002/0073019 A1 | 6/2002 | Deaton | |
| 2002/0077890 A1 | 6/2002 | LaPointe et al. | |
| 2002/0077966 A1 | 6/2002 | Harycki et al. | |
| 2002/0077978 A1 | 6/2002 | O'Leary et al. | |
| 2002/0082962 A1 | 6/2002 | Farris et al. | |
| 2002/0082985 A1 | 6/2002 | MacKay | |
| 2002/0084321 A1 | 7/2002 | Martens et al. | |
| 2002/0087415 A1 | 7/2002 | Allen et al. | |
| 2002/0087452 A1 | 7/2002 | Megiddo | |
| 2002/0087468 A1 | 7/2002 | Ganesan et al. | |
| 2002/0087469 A1 | 7/2002 | Ganesan et al. | |
| 2002/0091635 A1 | 7/2002 | Dilip et al. | |
| 2002/0099586 A1 | 7/2002 | Bladen et al. | |
| 2002/0099649 A1 | 7/2002 | Lee et al. | |
| 2002/0100803 A1 | 8/2002 | Sehr | |
| 2002/0107770 A1 | 8/2002 | Meyer et al. | |
| 2002/0107788 A1 | 8/2002 | Cunningham | |
| 2002/0111837 A1 | 8/2002 | Aupperle | |
| 2002/0111891 A1 | 8/2002 | Hoffman et al. | |
| 2002/0116331 A1 | 8/2002 | Cataline et al. | |
| 2002/0120537 A1 | 8/2002 | Morea et al. | |
| 2002/0120571 A1 | 8/2002 | Maung et al. | |
| 2002/0120846 A1 | 8/2002 | Stewart et al. | |
| 2002/0123934 A1 | 9/2002 | Tanaka et al. | |
| 2002/0123946 A1 | 9/2002 | Haworth et al. | |
| 2002/0123948 A1 | 9/2002 | Yumoto | |
| 2002/0128981 A1 | 9/2002 | Kawan et al. | |
| 2002/0129221 A1 | 9/2002 | Borgia et al. | |
| 2002/0133461 A1 | 9/2002 | Ramachandran | |
| 2002/0138390 A1 | 9/2002 | May | |
| 2002/0138398 A1 | 9/2002 | Kalin et al. | |
| 2002/0145039 A1 | 10/2002 | Carroll | |
| 2002/0147691 A1 | 10/2002 | Davis et al. | |
| 2002/0152116 A1 | 10/2002 | Yan et al. | |
| 2002/0152123 A1 | 10/2002 | Giordano et al. | |
| 2002/0152179 A1 | 10/2002 | Racov | |
| 2002/0156723 A1 | 10/2002 | Lilly et al. | |
| 2002/0165808 A1 | 11/2002 | Zamsky et al. | |
| 2002/0169658 A1 | 11/2002 | Adler | |
| 2002/0170966 A1 | 11/2002 | Hannigan et al. | |
| 2002/0178071 A1 | 11/2002 | Walker et al. | |
| 2002/0178112 A1 | 11/2002 | Goeller et al. | |
| 2002/0178117 A1 | 11/2002 | Maguire et al. | |
| 2002/0184123 A1 | 12/2002 | Sijacic et al. | |
| 2002/0184145 A1 | 12/2002 | Sijacic et al. | |
| 2002/0184151 A1 | 12/2002 | Maloney | |
| 2002/0188478 A1 | 12/2002 | Breeland et al. | |
| 2002/0188565 A1 | 12/2002 | Nakamura et al. | |
| 2002/0194081 A1 | 12/2002 | Perkowski | |
| 2002/0194096 A1 | 12/2002 | Falcone et al. | |
| 2002/0194117 A1 | 12/2002 | Nabe et al. | |
| 2002/0194119 A1 | 12/2002 | Wright et al. | |
| 2002/0198803 A1 | 12/2002 | Rowe | |
| 2002/0198807 A1 | 12/2002 | Kobayashi et al. | |
| 2002/0198817 A1 | 12/2002 | Dhir | |
| 2002/0198822 A1 | 12/2002 | Munoz et al. | |
| 2002/0198830 A1 | 12/2002 | Randell et al. | |
| 2002/0199182 A1 | 12/2002 | Whitehead | |
| 2003/0004874 A1 | 1/2003 | Ludwig et al. | |
| 2003/0005288 A1 | 1/2003 | Moskowitz et al. | |
| 2003/0018557 A1 | 1/2003 | Gilbert et al. | |
| 2003/0018567 A1 | 1/2003 | Flitcroft et al. | |
| 2003/0023557 A1 | 1/2003 | Moore | |
| 2003/0028481 A1 | 2/2003 | Flitcroft et al. | |
| 2003/0033252 A1 | 2/2003 | Buttridge et al. | |
| 2003/0037002 A1 | 2/2003 | Higgins et al. | |
| 2003/0040927 A1 | 2/2003 | Sato et al. | |
| 2003/0040959 A1 | 2/2003 | Fei et al. | |
| 2003/0046218 A1 | 3/2003 | Albanese et al. | |
| 2003/0048888 A1 | 3/2003 | Hopper et al. | |
| 2003/0055675 A1 | 3/2003 | Klein Twennaar | |
| 2003/0065618 A1 | 4/2003 | VanDeBoe, Jr. | |

(56) References Cited

U.S. PATENT DOCUMENTS

| | | |
|---|---|---|
| 2003/0065805 A1 | 4/2003 | Barnes, Jr. |
| 2003/0069780 A1 | 4/2003 | Hailwood et al. |
| 2003/0083933 A1 | 5/2003 | McAlear |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0105688 A1 | 6/2003 | Brown et al. |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |
| 2003/0125969 A1 | 7/2003 | Kizer et al. |
| 2003/0126011 A1 | 7/2003 | Bryman et al. |
| 2003/0130919 A1 | 7/2003 | Templeton et al. |
| 2003/0130940 A1 | 7/2003 | Hansen et al. |
| 2003/0130945 A1 | 7/2003 | Force et al. |
| 2003/0130952 A1 | 7/2003 | Bell et al. |
| 2003/0135464 A1 | 7/2003 | Mourad et al. |
| 2003/0144942 A1 | 7/2003 | Sobek |
| 2003/0144952 A1 | 7/2003 | Brown et al. |
| 2003/0149629 A1 | 8/2003 | Claridge et al. |
| 2003/0158782 A1 | 8/2003 | Thomson et al. |
| 2003/0158811 A1 | 8/2003 | Sanders et al. |
| 2003/0172039 A1 | 9/2003 | Guy et al. |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0200180 A1 | 10/2003 | Phelan, III et al. |
| 2003/0208421 A1 | 11/2003 | Vicknair et al. |
| 2003/0208439 A1 | 11/2003 | Rast |
| 2003/0208441 A1 | 11/2003 | Poplawski et al. |
| 2003/0212630 A1 | 11/2003 | Kahr |
| 2003/0213843 A1 | 11/2003 | Jackson |
| 2003/0217003 A1 | 11/2003 | Weinflash et al. |
| 2003/0217005 A1 | 11/2003 | Drummond et al. |
| 2003/0217329 A1 | 11/2003 | Good |
| 2003/0218066 A1 | 11/2003 | Fernandes et al. |
| 2003/0220863 A1 | 11/2003 | Holm et al. |
| 2003/0225663 A1 | 12/2003 | Horan et al. |
| 2003/0229525 A1 | 12/2003 | Callahan et al. |
| 2003/0229590 A1 | 12/2003 | Byrne et al. |
| 2003/0233255 A1 | 12/2003 | Dirienzo |
| 2003/0233278 A1 | 12/2003 | Marshall |
| 2003/0233305 A1 | 12/2003 | Solomon |
| 2003/0236679 A1 | 12/2003 | Galves et al. |
| 2003/0236747 A1 | 12/2003 | Sager |
| 2003/0237046 A1 | 12/2003 | Parker et al. |
| 2004/0002916 A1 | 1/2004 | Timmerman et al. |
| 2004/0010419 A1 | 1/2004 | Sinnott |
| 2004/0010462 A1 | 1/2004 | Moon et al. |
| 2004/0010465 A1 | 1/2004 | Michalski et al. |
| 2004/0019561 A1 | 1/2004 | Isturiz et al. |
| 2004/0019605 A1 | 1/2004 | Keown et al. |
| 2004/0029569 A1 | 2/2004 | Khan et al. |
| 2004/0039686 A1 | 2/2004 | Klebanoff |
| 2004/0039691 A1 | 2/2004 | Barratt et al. |
| 2004/0044606 A1 | 3/2004 | Buttridge et al. |
| 2004/0044951 A1 | 3/2004 | Repko et al. |
| 2004/0049455 A1 | 3/2004 | Mohsenzadeh |
| 2004/0049456 A1 | 3/2004 | Dreyer |
| 2004/0064401 A1 | 4/2004 | Palaghita et al. |
| 2004/0064409 A1 | 4/2004 | Kight et al. |
| 2004/0078324 A1 | 4/2004 | Lonnberg et al. |
| 2004/0078328 A1 | 4/2004 | Talbert et al. |
| 2004/0078332 A1 | 4/2004 | Ferguson et al. |
| 2004/0094624 A1 | 5/2004 | Fernandes et al. |
| 2004/0111363 A1 | 6/2004 | Trench et al. |
| 2004/0111371 A1 | 6/2004 | Friedman |
| 2004/0118930 A1 | 6/2004 | Berardi et al. |
| 2004/0128248 A1 | 7/2004 | Fujihara et al. |
| 2004/0133516 A1 | 7/2004 | Buchanan et al. |
| 2004/0138991 A1 | 7/2004 | Song et al. |
| 2004/0139001 A1 | 7/2004 | Henriques et al. |
| 2004/0143526 A1 | 7/2004 | Monasterio et al. |
| 2004/0149544 A1 | 8/2004 | Dal Ferro |
| 2004/0158522 A1 | 8/2004 | Brown et al. |
| 2004/0159700 A1 | 8/2004 | Khan et al. |
| 2004/0169088 A1 | 9/2004 | Nelms et al. |
| 2004/0172358 A1 | 9/2004 | Lent et al. |
| 2004/0177036 A1 | 9/2004 | Nutahara et al. |
| 2004/0181441 A1 | 9/2004 | Fung et al. |
| 2004/0193540 A1 | 9/2004 | Brown et al. |
| 2004/0199406 A1 | 10/2004 | Owens et al. |
| 2004/0201735 A1 | 10/2004 | Baron |
| 2004/0210498 A1 | 10/2004 | Freund |
| 2004/0210531 A1 | 10/2004 | Barron et al. |
| 2004/0228514 A1 | 11/2004 | Houle et al. |
| 2004/0230536 A1 | 11/2004 | Fung et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0242308 A1 | 12/2004 | Gray |
| 2004/0243506 A1 | 12/2004 | Das |
| 2004/0249689 A1 | 12/2004 | Naraki et al. |
| 2004/0249764 A1 | 12/2004 | Delitz et al. |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2004/0260646 A1 | 12/2004 | Berardi et al. |
| 2005/0004864 A1 | 1/2005 | Lent et al. |
| 2005/0004866 A1 | 1/2005 | Bonalle et al. |
| 2005/0006286 A1 | 1/2005 | Fery et al. |
| 2005/0021363 A1 | 1/2005 | Stimson et al. |
| 2005/0021466 A1 | 1/2005 | Buchanan et al. |
| 2005/0033619 A1 | 2/2005 | Barnes et al. |
| 2005/0033689 A1 | 2/2005 | Bonalle et al. |
| 2005/0033690 A1 | 2/2005 | Antognini et al. |
| 2005/0035847 A1 | 2/2005 | Bonalle et al. |
| 2005/0038718 A1 | 2/2005 | Barnes et al. |
| 2005/0038741 A1 | 2/2005 | Bonalle et al. |
| 2005/0040242 A1 | 2/2005 | Beenau et al. |
| 2005/0055254 A1 | 3/2005 | Schmidtberg et al. |
| 2005/0077349 A1 | 4/2005 | Bonalle et al. |
| 2005/0086166 A1 | 4/2005 | Monk et al. |
| 2005/0086178 A1 | 4/2005 | Xie et al. |
| 2005/0091156 A1 | 4/2005 | Hailwood et al. |
| 2005/0097033 A1 | 5/2005 | Pretell et al. |
| 2005/0097046 A1 | 5/2005 | Singfield |
| 2005/0097050 A1 | 5/2005 | Orcutt |
| 2005/0108102 A1 | 5/2005 | York |
| 2005/0108151 A1 | 5/2005 | York |
| 2005/0114367 A1 | 5/2005 | Serebrennikov |
| 2005/0114883 A1 | 5/2005 | Nagai et al. |
| 2005/0125295 A1 | 6/2005 | Tidwell et al. |
| 2005/0125296 A1 | 6/2005 | Tidwell et al. |
| 2005/0125315 A1 | 6/2005 | Munoz et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0137982 A1 | 6/2005 | Michelassi et al. |
| 2005/0144059 A1 | 6/2005 | Schuessler |
| 2005/0144143 A1 | 6/2005 | Freiberg |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160051 A1 | 7/2005 | Johnson |
| 2005/0167342 A1 | 8/2005 | Vullriede et al. |
| 2005/0167488 A1 | 8/2005 | Higgins et al. |
| 2005/0171898 A1 | 8/2005 | Bishop et al. |
| 2005/0171901 A1 | 8/2005 | Rosenblatt et al. |
| 2005/0177480 A1 | 8/2005 | Huang |
| 2005/0177523 A1 | 8/2005 | Weiss et al. |
| 2005/0179251 A1 | 8/2005 | Wagoner et al. |
| 2005/0182654 A1 | 8/2005 | Abolfathi et al. |
| 2005/0182735 A1 | 8/2005 | Zager et al. |
| 2005/0189427 A1 | 9/2005 | Brown et al. |
| 2005/0199708 A1 | 9/2005 | Friedman |
| 2005/0199709 A1 | 9/2005 | Linlor |
| 2005/0203857 A1 | 9/2005 | Friedman |
| 2005/0209954 A1 | 9/2005 | Asher et al. |

(56) References Cited

U.S. PATENT DOCUMENTS

| | | |
|---|---|---|
| 2005/0209955 A1 | 9/2005 | Underwood et al. |
| 2005/0216421 A1 | 9/2005 | Barry et al. |
| 2005/0216888 A1 | 9/2005 | Drummond et al. |
| 2005/0228751 A1 | 10/2005 | Keown et al. |
| 2005/0234789 A1 | 10/2005 | Czyzewski et al. |
| 2005/0246627 A1 | 11/2005 | Sayed |
| 2005/0251446 A1 | 11/2005 | Jiang et al. |
| 2005/0256802 A1 | 11/2005 | Ammermann et al. |
| 2005/0261916 A1 | 11/2005 | McCall et al. |
| 2005/0261955 A1 | 11/2005 | Humble et al. |
| 2005/0261995 A1 | 11/2005 | Phelan |
| 2005/0273425 A1 | 12/2005 | Yamazaki |
| 2005/0283429 A1 | 12/2005 | Bates et al. |
| 2005/0283437 A1 | 12/2005 | McRae et al. |
| 2005/0289051 A1 | 12/2005 | Allin et al. |
| 2006/0004629 A1 | 1/2006 | Neemann et al. |
| 2006/0015463 A1 | 1/2006 | Gupta et al. |
| 2006/0026073 A1 | 2/2006 | Kenny, Jr. et al. |
| 2006/0029261 A1 | 2/2006 | Hoffman et al. |
| 2006/0031718 A1 | 2/2006 | Thornhill et al. |
| 2006/0035444 A1 | 2/2006 | Nakamura et al. |
| 2006/0036553 A1 | 2/2006 | Gupta et al. |
| 2006/0039733 A1 | 2/2006 | Meyerhofer |
| 2006/0041540 A1 | 2/2006 | Shannon et al. |
| 2006/0053056 A1 | 3/2006 | Alspach-Goss et al. |
| 2006/0064329 A1 | 3/2006 | Abolfathi et al. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0095350 A1 | 5/2006 | Hall et al. |
| 2006/0095358 A1 | 5/2006 | Viarengo et al. |
| 2006/0106650 A1 | 5/2006 | Bush |
| 2006/0106717 A1 | 5/2006 | Randle et al. |
| 2006/0122943 A1 | 6/2006 | Mann, III et al. |
| 2006/0136335 A1 | 6/2006 | Ferguson |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0155554 A1 | 7/2006 | Mo |
| 2006/0161478 A1 | 7/2006 | Turner et al. |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0208060 A1 | 9/2006 | Mendelovich et al. |
| 2006/0208064 A1 | 9/2006 | Mendelovich et al. |
| 2006/0208065 A1 | 9/2006 | Mendelovich et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0011089 A1 | 1/2007 | DeSchryver |
| 2007/0136211 A1 | 6/2007 | Brown et al. |
| 2007/0138255 A1 | 6/2007 | Carreon et al. |
| 2007/0198404 A1 | 8/2007 | Hirka |
| 2007/0208671 A1 | 9/2007 | Brown et al. |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0082207 A1* | 4/2008 | Sjostrom ................. 700/231 |
| 2008/0116283 A1 | 5/2008 | Newbrough et al. |
| 2008/0133350 A1 | 6/2008 | White et al. |
| 2008/0193008 A1 | 8/2008 | Mount et al. |
| 2008/0262915 A1 | 10/2008 | Gojkovic et al. |
| 2008/0282324 A1 | 11/2008 | Hoal |
| 2009/0043651 A1 | 2/2009 | Schwarz |
| 2009/0112639 A1 | 4/2009 | Beaver |
| 2009/0171778 A1 | 7/2009 | Powell |
| 2009/0313110 A1 | 12/2009 | Asai et al. |
| 2010/0049654 A1 | 2/2010 | Pilo |
| 2010/0057551 A1 | 3/2010 | Blaisdell |
| 2010/0057553 A1 | 3/2010 | Ameiss et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082490 A1 | 4/2010 | Rosenblatt et al. |
| 2010/0153199 A1 | 6/2010 | Ahmad |
| 2011/0259706 A1* | 10/2011 | Aas et al. ................. 194/206 |

FOREIGN PATENT DOCUMENTS

| | | |
|---|---|---|
| EP | 1014318 | 6/2000 |
| JP | 2000029963 | 1/2000 |
| JP | 2001-266039 | 9/2001 |
| JP | 2002-24618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 01/18060 | 3/2000 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Kutler, A Different Drummer on the Data Highway, American Banker, Section No. 91, vol. 160, May 12, 1995, p. 14.

Epper, A Player Goes After Big Bucks in Cyberspace, American Banker, vol. 160, No. 86, ISSN 0002-7561, May 5, 1995, p. 17.

Berry et al., A potent new tool for selling datbse, Business Week, Cover Story, Sep. 5, 1994, pp. 56-62.

Alshawl M. et. al.., Alshawi, M. et. al., An IFC Web Based Collaborative Construction Computer Environment Wisper.

Applets, java.sun.com, May 21, 1999.

Associates National Bank (DE) Credit Card, The Associates, www.theassociates.com/consumer/credit_cards/main.html, Apr. 6, 1999, 6 pages.

At Your Request, www.wingspanbank.com, Sep. 28, 1999.

Anonymous, Aversion Therapy Banks Overcoming Fear of the Net to Develop Safe Internet-based Payment System w/ Netscape Communicator, Network World, ISSN 0887-7661, Dec. 12, 1994.

Brown, Keith, Brown, The Builders Revolution, BuildNet Publishing Division, Jan. 1996, ISBN 096493390x.

Butterworth, Paul, Butterworth; 'Automating the Business Process of Mission Critical Distributed Applications'; Forte Software, Inc.; Apr. 1997.

JAVA, Banking on JAVA(TM) Technology, java.sun.com, May 21, 1999.

Bechtel Construction Operations Incorporated Standardizes on Primavera's Expedition Contract Management Software, Business Wire, Jul. 27, 1999.

Fusaro, Roberta, Builders Moving to Web tools Computerworld, Nov. 16, 1998, vol. 32, No. 46, pp. 51, 53.

Microsoft, CNBC on MSN Money Microsoft Money 2003 Deluxe.

Anonymous, Corba Overview, arch2.htm at pent21.infosys.tuwien.ac.at, May 25, 1999.

Calyx Software, Point for Windows Version 3.x Interface Marketing Guide, Rev. Dec. 8, 1999, Copyright 1999.

Vandenengel, Cards on the Internet Advertising on a $3 Bill, Industry Intelligence, Feb. 1, 1995, pp. 46-48.

Kutler, Cash Card Creator Looking Beyond Mondex, Feb. 9, 1995.

Bank, Cash, Check, Charge—What's Next?, Seattle Times, Mar. 6, 1995.

Marlin, Chasing Document Management, Inform, vol. 13, No. 4, Apr. 199, p. 76-82.

Consortium Created to Manage Common Electronic Purse Specifications, http//www.visa.com/av/news/PRmisc051199.vhtml, printed Feb. 23, 2001.

(56) References Cited

OTHER PUBLICATIONS

Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.-Oct. 2001.
Mitchell, Cyberspace Crafting Software . . . , Business Week, Feb. 27, 1999, pp. 78-86.
Definition of 'Opt Out', Wiktionary, (http://en.wiktionary.org/wiki/opt_out), Aug. 18, 2008 (1 page).
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash Can't Live With it, Can't Live Without it, The American Lawyer, Mar. 1, 1995, pp. 116-117.
Thomas, Enterprise JAVABEANS(TM) Technology Server Component Model for the Java(TM) platform, java.sun.com, May 2, 1999.
Seibert, Paul, Facilities Planning & Design for Financial Institutions Bankline Publications, 1996, ISBN 1-55738-780-X.
Owens, David, Facilities Planning & Relocation RSMeans, 1993, ISBN 0-87629-281-3.
Maize, Fannie Mae on the Web, Doucment ID 52079, May 8, 1995.
FreeMarkets, Interop Enterprise Award Winner for FreeMarkets Web Applications, Copyright 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java Sun Micro Says American Express to Use Java for Smart Card, ABCNews.com, printed on Jun. 6, 2000.
Getting Started Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN 0740-1604, Mar. 20, 1995.
Meredith, Internet bank moves closer to virtual reality, USA Today, May 5, 1995.
Larsen, Amy, Internet goes to Work for Builders, InterWeek, Nov. 16, 1998, Issue 741.
Radosevich, Is Work Flow Working?, CNN.com, Apr. 6, 1999 at <http//www.cnn.com/TECH/computing/9904/06/workflow/ent.idg, p. 1 of 5, retrieved from the internet on Nov. 28, 2005.
JAVA, JAVA (TM) Technology in the Real World, java.sun.com, May 21, 1999.
JAVA, JAVA(TM) Remote Method Invocation (RMI) Interface, java.sun.com, May 32, 1999.
JAVA, JAVA(TM) Servlet API, java.sun.com, May 21, 1999.
Frank, John N. Frank, Beyond Direct Mail, Credit Card Management, vol. 9, Iss. 5, Aug. 1996, 4pgs.
Kilian-Kehr, Roger, Kilian-Kehr, Mobile Security with Smartcards, Dissertation, Apr. 8, 2002.
Kristol, Kristol, HTTP Cookies Standards, Privacy, and Politics, ACM Transactions on Internet Technology, vol. 1, No. 2,p. 151-198, Nov. 2001.
Li, et al., Li et al., Combined Coherence and Prefetching Mechanisms for Effective Web Caching, IEEE, p. 3034-3038, 2001.
OMG, Library, www.omg.com, May 25, 1999.
Myers, Randy, Myers, The Wired World of Investment Information, Nation's Business, Washington, vol. 85, Iss. 3, p. 58, Mar. 1997.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on a Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Muse Technologies, Leading the New Age of Perceptual Computing, Apr. 26, 1999.
Nelte, et al., Nelte, et al., Cookies Weaving the Web into a State, Crossroads, vol. 7, Issue 1, ACM Press, 6 pages, Fall 2000.
Nowlin, Jerry L., Nowlin, Construction Financing to Build Your Own Home, First Edition, Jerry L. Nowlin Consulting, Inc., ISBN 0962864307, Jul. 1990.
Sirbu, et al, NetBill an Internet Commerce System Optimized for Network Delivered Services, printed on Feb. 27, 1995.
Mitchell, Netlink Goes After an Unbanked Niche, Card Technology, ISSN 1093-1279, Sep. 1999, p. 22.
Barnham, Network Brings Together Producers and Companies, Document ID 17347.
Houlder, OFT Gives the Individual Top Priority Report Calls for Deregulation of Business Lending, Document ID 91716, Jun. 8, 1994.
Omware, Inc., Web Pages, Feb. 2000, Retrieved from http//web.archive.org/web20000226033405/www.omware.com/products.html, Retrieved from the Internet on Nov. 28, 2005.
Anonymous, Overview of CORBA, May 25, 1999.
Youll, James, Peer to Peer Transactions in Agent Mediated Electronic Commerce.
Harris, Planning Using Primavera Project Planner P3 Version 3.0, User Guide, Copyright 1999 by Eastwood Harry Pty Ltd., 1999.
Johnston, Pondering Passport Do You Trust Microsoft With Your Data?, www.pcworld.com/resource/printable/article/0.aid,63244,00.asp, Sep. 24, 2001.
Primavera Systems, Inc., Primavera Expedition User Guide, Version 6.0, Primavera Systems, Inc., 1998.
Primavera Systems Delivers Expedition Express,Business Wire, Feb. 23, 1999.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Van Collie, Shimon Craig, Problem Disbursement Control Needed Construction Loan Tool from PriMerit NewTrend.
Product Data Integratinn Technologies, Inc., Step Integratin Authors, printed on Apr. 26, 1999.
Resource Center Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA Pro-Net, U.S. Small Business Administration Procurement Marketing and Access Network, Last Modified Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Deckmyn, Dominique, San Francisco manages $45M project via web-based Service, Computerworld, Aug. 9, 1999, vol. 33, No. 32, p. 14.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order 00A6004, Jan. 1, 2000.
Shibata, Seventh International Conference on Parallel and Distributed Systems Workshops, IEEE Computer Society, Jul. 4-7, 2000.
Siebel, Siebel Ensuring Customer Success, www.siebel.com, Nov. 17, 1999.
SmartAxis, How it works, http//www.smartaxis.co.uk/seller/howitworks.html, printed on Feb. 23, 2001.
Mosig, Richard, Software Review the Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.
Thomas Publishing Company, SoluSource for Engineers by Engineers, Thomas Publishing Company, Apr. 26, 1999.
JAVA, Staying in Touch with JNDI, java.sun.com, May 21, 1999.

(56) References Cited

OTHER PUBLICATIONS

Summary of the At Your Request Architecture, First USA Bank Confidential and Proprietary, Apr. 2, 1999, pp. 1-8.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, 03-93, Order 93A 60636, Mar. 1, 1993, pp. 451-454.
Brown, Keith, The Buiders Revolution, Internet Archive Wayback Machine, Jan. 1998.
The Check is in the Email, Information Today, vol. 12, No. 3, ISSN 8755-6286, Mar. 1995.
Cotts, David, The Facility Management Handbook Second Edition AMACM, 1998, ISBN 0-8144-030-8.
JAVA, The JDBC(TM) Data Access API, java.sun.com, May 21, 1999.
Carden, Philip, The New Face of Single Sign-on, Network Computing, http//www.networkcomputing.com, printed Dec. 29, 2000, 4 pages.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Yee, Bennet, Using Secure Coprocessors.
OMG, Welcome to OMG's CORBA for Beginners Page!, www.omg.co, May 25, 1999.
OMG, What is CORBA?, www.omg.com, May 25, 1999.
Fujimura et al., XML \Toucher Generic Voucher Language, Feb. 2003.
eCharge, eCharge Corporation, www.echarge.com, Dec. 3, 1999.
Anonymous; "New Branch Features Help Educate Customers"; Staff Spotlight; Published for NBD Employees in Southeast Michigan; vol. 10, No. 10, Oct. 1997.
Ball, Robert S.; "NBD branch would have video, but no tellers"; Daily Tribune, Royal Oak, Mich, PM-Circl 38,101; Jul. 31, 1995.
Killian-Keher, Roger, Mobile Security with Smartcards, Dissertation, Apr. 8, 2002.
FOIA # 09-02-12 Responsive Records Book #5, Mar. 12, 2009, acs00278229.
Citibank EBT Services, Pricing Proposal T-DCS, Best and Final Pricing for Treasury Debit Card Services Pilot—Houston, Texas, Sep. 1991, acs00277456.
FOIA # 09-02-12 Responsive Records Book #3, Mar. 12, 2009, acs00277531.
FOIA # 09-02-12 Responsive Records Book #11, Mar. 12, 2009, acs00279715.
Eaton, Kit; "Apple ATM? Patent Suggests Reinvented Cash Machines With iPhone Marriage"; Fast Company.com; May 24, 2010; 1 page.
Anonymous; "Exploring Apple's New e-Wallet Patent on ATM Transactions"; Patently Apple; May 24, 2010; www.patentlyapple.com; 11 pages.
Anand, Anika; "Citi Opens 'Bank of the Future' With Touchscreens in Union Square"; Business Insider; Dec. 16, 2010; 2 pages.

\* cited by examiner

SYSTEM AND METHOD FOR FINANCIAL SERVICES DEVICE USAGE

FIELD OF PREFERRED EMBODIMENTS

Exemplary embodiments relate generally to providing financial services, such as through devices such as financial services kiosks and Automated Teller Machines.

BACKGROUND

In a typical business interaction with a financial institution, a representative of the business brings in a bag containing the cash and checks received at the business. The bag is typically locked. The bag is handed over to a teller who proceeds to process the contents for deposit. In some case, a withdrawal, such as for cash and coins, is desired and the teller provides the representative with the requested currency. This is done daily or near daily for most businesses. In some cases, the bag is physically deposited into a slot or other container at the financial institution and is then processed separately; in many cases, this is the after-hours procedure. A separate trip is required to make a withdrawal, which must be done during business hours of the financial institution. This process is manpower intensive and slow because of the manual involvement of financial institution employees in processing the bag contents.

In other interactions with a financial institution, typically at a drive up teller area, a customer uses a pneumatic tube system or a drawer for conducting a transaction at a drive-up teller location. The pneumatic tube system typically has a cylinder that serves as the container for conveying material related to the transaction between the customer and the teller. The drawer system involves the customer placing material for the transaction into an opening in the drawer, which is then closed to convey the material to the teller. This process is manpower dependent since the teller must open the container and manually process the contents and is also dependent upon the infrastructure to support the pneumatic tube and the drawer system. These features also cannot be retrofitted in an efficient manner to financial institution locations.

These and other deficiencies exist.

SUMMARY OF THE PREFERRED EMBODIMENTS

An exemplary embodiment includes a computer implemented method with the following steps: receiving, by a financial services device, comprising at least one computer processor, a container from a business entity, wherein the container has an internal volume and is configured to hold contents comprising one or more of cash, coins, and checks and the container is received into a receptacle at the financial services device; extracting, by the financial services device, the contents; processing, by the financial service device, the contents; and ejecting the container by the financial services device following the processing of the contents.

Another exemplary embodiment includes an apparatus, including: a container having an internal volume, the internal volume being configured to hold one or more of cash, coins, and checks; a locking cover for sealing the container, wherein the locking cover is tamperproof; a computer processor comprising computer memory, a display, and an input device integral to the container; a tracking system integral to the container; the container being configured to engage with a financial services device and establish an interface between the container and the financial services device during the mating such that the contents of the container are removed and processed by the financial services device.

Another exemplary embodiment includes a financial services device, including: a processor; and a memory comprising computer-readable instructions which when executed by the processor cause the processor to perform the steps comprising: receiving a container from a business entity, wherein the container has an internal volume and is configured to hold contents comprising one or more of cash, coins, and checks and the container is received into a receptacle at the financial services device; extracting the contents; processing the contents; and ejecting the container following the processing of the contents.

Another exemplary embodiment includes a computer implemented method with the following steps: receiving, by a device, comprising at least one computer processor, a container associated with a business entity, wherein the container has an internal volume and is configured to hold contents comprising a first set of one or more of cash and coins and the container is received into a receptacle at the device and the device is located at a location of the business entity; inserting one or more of cash and coins into the container in response to the receiving of the container, wherein the first set of one or more of cash and coins comprises an inventory for issuance to an employee for use during a course of business for the business entity; ejecting the container by the device following the inserting.

Another exemplary embodiment includes a computer implemented method with the following steps: receiving, by a financial services device, a container from a customer of a financial institution associated with the financial services device, wherein the container has an internal volume and is configured to hold contents comprising one or more of cash, coins, and checks and the container is received into a receptacle at the financial services device and wherein further the container is paired with the customer; extracting, by the financial services device, the contents; and processing, by the financial service device, the contents.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

DETAILED DESCRIPTION OF THE PREFERRED EMBODIMENTS

Figure 1:
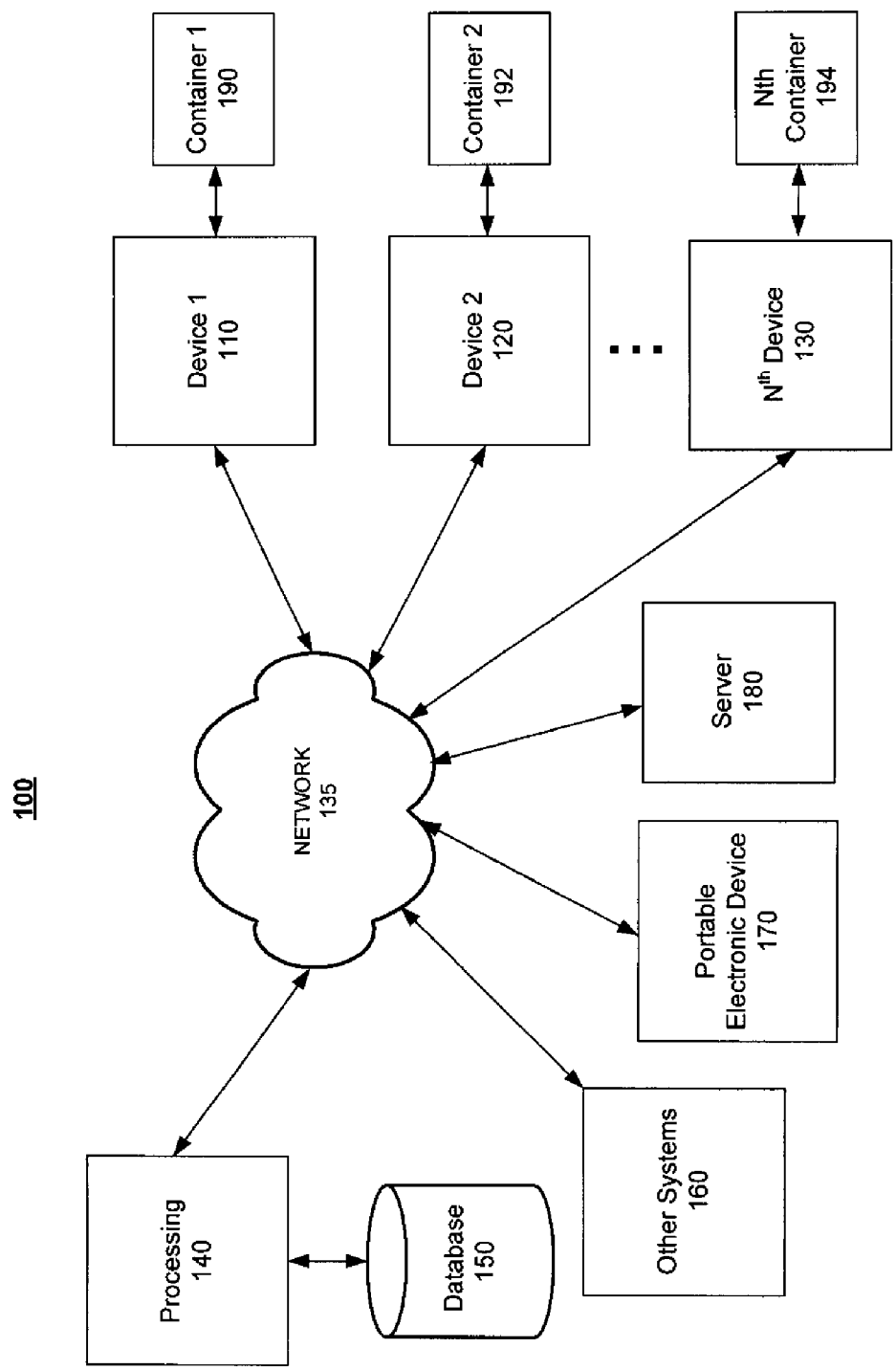
FIG. 1 is a diagram of a system in accordance with an exemplary embodiment.

It will be readily understood by those persons skilled in the art that the embodiments of the inventions described herein are capable of broad utility and application.

Accordingly, while the invention is described herein in detail in relation to the exemplary embodiments, it is to be understood that this disclosure is illustrative and exemplary of embodiments of the invention are described to provide an enabling disclosure of the invention. Accordingly, the disclosure is not intended to be construed to limit the embodiments of the invention or otherwise to exclude any other such embodiments, adaptations, variations, modifications and equivalent arrangements. While the various embodiments of the present invention are described in the context of financial transaction/services devices and providing of financial service through such devices, the methods and systems described herein may be applied to other related services involving interaction with similar devices in other industries and services.

The following descriptions are provided of different configurations and features according to exemplary embodiments. These configurations and features may relate to providing financial services through financial services devices. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details regarding the present invention. It should also be appreciated that these exemplary embodiments are provided as non-limiting examples only.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that embodiments described may be integrated into and run on a computer, which may include a programmed processing machine which has one or more processors. Such a processing machine may execute instructions stored in a memory to process the data and execute the methods described herein.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

The logic herein described may be implemented by hardware, software, and/or a combination of the two. In embodiments where the logic is implemented using software, upgrades and other changes may be performed without hardware changes. The software may be embodied in a non-transitory computer readable medium.

Exemplary methods are provided by way of example herein, as there are a variety of ways to carry out the method disclosed herein. The methods depicted in the Figures may be executed or otherwise performed by one or a combination of various systems, such as described herein. Each block shown in the Figures represents one or more processes, methods, and/or subroutines carried out in the exemplary methods. Each block may have an associated processing machine or the blocks depicted may be carried out through one processor machine. Furthermore, while the steps may be shown in a particular order, it should be appreciated that the steps may be conducted in a different order.

Financial services devices, as used herein, may include machines, kiosks, and stations for performing financial services transactions. These devices include, but are not limited to, automated teller machines ("ATMs"), personal teller machines ("PTMs"), financial self-service devices, financial services kiosks, financial transaction devices, portable electronic devices, money machines, cash machines, bank machines, and bancomats. The financial services device may have two way video and audio capabilities to enable a user to interact with a customer representative of the financial institution on a 24 hour a day basis. The remote customer representative may have the capability to remotely operate and control the financial services device to assist the user.

Financial institution, as used herein, may include institutions that provide financial services to their members or customers. Financial institutions may include, but are not limited to banks, credit unions, trust companies, mortgage loan companies, insurance companies, investment banks, underwriters, armored car companies, and brokerage firms.

According to exemplary embodiments, an intelligent process is provided for a business or customer to interface with a financial institution. A container is provided that is capable of interfacing with a financial transaction device. The container may be referred to as a cash drawer or a cartridge or a cassette. The container may have one or more internal compartments. The internal compartments may be sized to accommodate cash, coins, checks, and/or other financial instruments or documents. The container may be available in a variety of sizes. The container may take a number of forms and variations. The container is capable of being sealed and locked in a tamper proof manner. A tracking device may be included with the container. The container may contain a computing device. The container may be programmed to understand its own status and/or state. For example, the container may be able to sense it has contents, is locked, is being moved, etc. The container may be color coded or marked or labeled to enable pairing to a particular business or customer. The pairing may be important in the case of processing of multiple containers simultaneously from different sources. Thus, the container may be designed as a vehicle through which a business or a customer can put its cash, coins, checks, and/or financial instruments for deposit. The container may be communicatively coupled to the device. The container may communicate with the device. The container may send status updates to the device. For example, the computing device of the container may communicatively couple with the device. The container may inform the device of its status. For example, the container may notify the device if it has a fault, is tampered with, is full, etc. The device in turn may notify or otherwise report the financial institution regarding the container status. In some embodiments, the device may notify or otherwise report to the customer or business regarding the container status. The reporting may be performed electronically using a predetermined electronic path. For example, texts or email may be used. In other embodiments, the container may provide the status updates, notifications, and/or reports directly to the financial institution and/or customer or business.

The container may then be taken to a designated location having a financial transaction device with which the container can interface. The financial transaction device may be located at a branch of a financial institution or another location, such as at the business itself or at another location. In some embodiments, the financial transaction device may be a free standing device, divorced from the financial institution location.

The container can be inserted or otherwise interfaced with the financial transaction device. The person inserting the device (such as the customer or business representative) may be required to authenticate themselves to the financial transaction device. The financial transaction device may unlock and unseal the container and remove the contents. The financial transaction device may communicatively couple with the container through its computer device. The financial transaction device may process the contents of the container.

The processing may include reporting the status and results of the processing to the financial institution. The reporting may be performed electronically over a computer network. In some embodiments, the device may be capable of recycling the contents from the container. The device may be capable of destroying the contents of the container. In some embodiments, the device may be capable of producing currency and/or financial instruments. In other embodiments, the device may need to be periodically emptied and loaded with currency and/or financial instruments. The device may report or signal when it requires service or emptying or restocking as appropriate. Accordingly, the device may be aware of its status, as well as that of the container. The device may communicatively couple with the container. The device may track the container's status using the tracking system that may be part of the device.

The financial transaction device may insert contents into the container and reseal and relock the container. In this manner, a withdrawal may be made. The inserted contents may include cash and coil, including strapped cash and rolled coins. The withdrawal may be pre-staged with the financial transaction device through a remote interface. In some embodiments, the withdrawal may be programmed into the container. In other embodiments, the withdrawal may be requested at the financial transaction device.

Upon completion of the processing, a receipt may be provided. In some embodiments, the receipt may be provided electronically. The process may be fully automated such that a human teller or representative is not required for the processing of the container.

According to exemplary embodiments, an automated, secure process may be provided for businesses to manage cash using the container. A business, such as a merchant, may have a series of containers for internal business use. The containers may be configured to mate with the business's point of sale devices. In some embodiments, the containers may double as cash drawers for the point of sale devices. The container may be assigned to a particular employee and may be loaded at the start of the employee's shift with a set amount of cash and coins. The container may be loaded form a device located at the business. The device may serve as a central safe or depository for the business's funds. The device may be configured as described here for interfacing with the container according to exemplary embodiments. The device may be managed by the financial institution. The device may have multiple receptacles to receive multiple containers at once.

The container may be inserted into or otherwise interfaced with the point of sale device. The point of sale device may extract the contents of the container into a cash drawer, or in the case of the container being the cash drawer, use the container. Upon completion of the employee's shift, the container may be reloaded by the point of sale device with cash and coins collected during the course of business. The point of sale device may seal and lock the container. The container may be ejected or otherwise removed from the point of sale device.

In some embodiments, the container may indicate when it is full and needs to be removed from the point of sale device and returned to the device for processing and emptying.

The container may then be returned to the device and the contents processed. The container may be stored by the device or it may be emptied and ejected. The device may then provide automated balancing and accounting of the daily intake and expenditures of the business. The automated process may assist in preventing and/or identifying fraud in the handling of cash and coins.

As part of the processing, the device may band bills and roll coins to keep its contents organized. These banded bills and rolled coins may be dispensed into containers for use by the business.

To reload the container, it may be reinserted by the employee at his/her next shift. The business may have multiple containers. Each may be assigned to one or more employees. In some embodiments, an employee may not have an assigned container, but may take any container and enter a code or other identification into the container to indicate who is using the particular container. The code or other identification may be entered into the device following insertion of a container. In some embodiments, the employee may specify the contents to be inserted into the device. In other embodiments, the contents of the container may be predetermined.

At certain intervals, the device may be serviced by the financial institution or a designed third party to empty the contents and restock as needed. In some embodiments, the contents of the device may be processed by the device by loading a container and then the container being handled according to the methods described herein.

In some embodiments, the containers may be serviced and handled by a third party. For example, a third party may handle, distribute, collect, and process containers for one or more business locations. The third party may have one or more devices capable of processing the containers. In certain embodiments, the containers may be capable of communicating with the third party as to the container's status. For example, if the container is full and needs processed, the container may communicate to the third party this status. The third party may then proceed to the container's location to pick-up and process the container. The communication may be over a computer network and/or over a cellular network and/or over a wireless network. The third party may convey contents processed from containers, such as currency and coins, to the financial institution. The financial institution may provide the third party with currency and coins to load into containers. In some embodiments, the third party may use one or more containers to transfer currency, coins, checks, and other financial instruments to the financial institution. The third party may receive currency and coins in the container.

An override code may be used to allow appropriate business personnel to perform withdrawals from the device of particular amounts to meet business needs, such as, for example, petty cash or paying vendors.

According to exemplary embodiments, the required infrastructure to support the systems described herein may be retrofitted to existing financial services devices or built-in to new financial services devices. The retrofit may require a hardware upgrade and a software upgrade as well as additional hardware added to the existing financial services device. Existing pneumatic tube systems (as described in the background) may be integrated into exemplary embodiments by replacing the teller with a computer machine to perform the container processing.

FIG. 1 is a system according to an exemplary embodiment of the invention. System 100 may provide various functionality and features associated with the program. More specifically, system 100 may include a device 110, a second device 120, and an Nth device 130, a network 135, a processing module 140, a database 150, other systems 160, a portable electronic device 170, a server 180, and containers 190, 192, and 194.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

According to exemplary embodiments, the system 100 may be configured to carry out the methods as described herein. The system 100 may have device 110 associated therewith. A second device 120 and an Nth device 130 may be further associated with the system 100. The devices 110, 120, and 130 may each be a processing machine. Each device 110, 120, and 130 may include software and/or modules to implement the methods described herein according to exemplary embodiments. Each device 110, 120, and 130 may provide processing, display, storage, communications, and execution of commands in response to inputs from a user thereof and respond to requests from the software and/or modules.

The devices 110, 120, and 130 may each serve as a client side. Each device 110, 120, and 130 may be a "fat" client, such that the majority of the processing may be performed on the client. Alternatively, the device 110, 120, and 130 may each be a "thin" client, such that the majority of the processing may be performed in the other components of the system 100 as shown in FIG. 1. The devices 110, 120, and 130 may be configured to perform other functions and processing beyond the methods described herein. The devices 110, 120, and 130 may each be a part of a larger system associated with the financial institution. The devices 110, 120, and 130 may be multi-functional in operation.

Each device 110, 120, and 130 may have a display and an input device associated therewith. The display may be monochrome or color. For example, the display may be a plasma, liquid crystal, or cathode ray tube type display. The displays may be touch screen type displays. The devices 110, 120, and 130 may have more than one display. The multiple displays may be different types of displays. The display may have sub-displays there on. For example, the device 110, 120 and 130 may have a large display surface. The display for the user interface may occupy a portion or less than the whole of the large display surface.

The input device may be a single device or a combination of input devices. For example, the input devices may include a keyboard, both full-sized QWERTY and condensed, a numeric pad, an alpha-numeric pad, a track ball, a touch pad, a mouse, selection buttons, and/or a touch screen. As described above, the display may serve as an input device through using or incorporating a touch screen interface. The devices 110, 120, and 130 may include other devices such as a printer and a device for accepting deposits and/or dispensing currency and coins.

The device 110, 120, and 130 may have one or more cameras, optical sensors, or other sensing devices. The sensors may be computer controlled and may capture digital images.

According to some embodiments, the devices 110, 120, and 130 may be financial services devices as described herein. The financial services device may be a transaction device for conducting transactions with the financial institution. For example, the devices 110, 120, and 130 may each be an Automated Teller Machine (ATM) or similar self-service device. In other embodiments, the devices 110, 120, and 130 may each be financial services kiosks. The devices 110, 120, and 130 may have different levels of functionality. The device 110, 120, or 130 may be a dedicated transaction device for exemplary embodiments. In some embodiments, the device 110, 120, or 130 may be an existing transaction device that has been upgraded to perform the methods described herein. For example, an ATM may be upgraded with a receptacle to receive the container according to exemplary embodiments. The upgrade may include a receptacle module and other software/hardware upgrades to perform the methods described herein.

In some embodiments, the devices 110, 120, and 130 may be a portable or hand-held computing or electronic devices, or other types of computing devices, which have the described functionality. For example, the devices 110, 120, and 130 may be tablet computing devices. The tablet computing device may be used to perform transactions similar or the same as those at a traditional ATM as described herein or to interface with a financial services device. For example, the tablet computing device may be a part of the financial services device. Additional devices may be coupled to the portable or hand-held computing device to perform various functions such as accepting deposits or dispensing currency.

The devices 110, 120, and 130 may provide various functionality and features for conducting transactions with the financial institution. Accordingly, the devices 110, 120, and 130 may be referred to as financial transaction devices. For example, the devices 110, 120, and 130 may be capable of accepting deposits and mixed deposits, withdrawals and multi-denomination withdrawals, including strap cash out, coin deposits/withdrawal, including both rolled and loose coin withdrawals, check cashing, statement printing, wires, bill pay, and check printing. It should be appreciated that the devices 110, 120, and 130 may be capable of other functions and features. Transactions may be supported relating to other financial institutions. For example, the device may be part of a network associated with more than one financial institution. The network may be managed by a third party.

The devices 110, 120, and 130 may have a log-in device associated therewith. The log-in device may be used to allow access to the device. The log-in device may require a particular input or it may accept a combination of inputs. The input may serve as an authentication of the user to the device 110, 120, or 130 and the system 100 in general. Various authentication or log-on systems and methods may be used. For example, these methods and systems may include entering a password or PIN (Personal Identification Number) or using a card to log-on, either via swiping the card through a reader, such as a magnetic stripe reader or a smart chip reader, or through a radio frequency system (which may require that the card be placed in proximity to an appropriate reader (i.e., a contactless system), such as RFID (Radio Frequency Identification) or NFC (Near Field Communications). For example, the Blink® system may be used. It should be appreciated that the card may include a combination of a magnetic stripe, a smart chip, and radio frequency. Further, the use of the card is exemplary only and the card may include fobs, stickers, and other devices. Biometrics may be used, such as fingerprints, facial recognition, speech recognition, or retinal scan. A combination of these systems may be used. Biometrics may be used in addition to other log-in methods and systems.

The devices 110, 120, and 130 may be communicatively coupled to a network 135. Accordingly, the devices 110, 120, and 130 may be geographically dispersed. Conversely, two or more of devices 110, 120, and 130 may be located in close proximity to provide a cluster of devices for customer use. For example, the devices may be located within or near a branch office of the financial institution. The devices may be located in other locations such as retailers or merchants or other business entities. The devices may be located at locations proximal to the business locations of retailer or merchants or other entities. In some embodiments, the devices 110, 120, and 130 may communicate with each other over the network.

According to exemplary embodiments, the devices 110, 120, and 130 may have a receptacle for receiving a container as described herein. For example, the devices 110, 120, and 130 may be configured to receive and mate with containers 190, 192, and 194 (described below). The receptacle may be configured to receive the container and to communicatively couple or otherwise interface with the container. The receptacle may receive the container internally to the device 110, 120, and 130. Each device 110, 120, and 130 may have multiple receptacles to handle multiple containers at one time.

Network 135 may be a computer based network, with one or more servers and/or computer processors. For example, network 135 may be the Internet or a network connected to the Internet. The network 135 may be a satellite or cellular based network. Information and data may be exchanged through the network 135 between the various components of the system 100. In alternative embodiments, the network 135 may be a local area network within the financial institution that may be connected to or interface with the Internet. It should be appreciated that the network 135 may be a combination of local area networks, wide area networks, and external networks, which may be connected to the Internet.

The processing module 140 may be communicatively coupled to the network 135. The processing module 140 may perform operations associated with the establishment, configuration, and application of the programs accordingly to exemplary embodiments. The processing module 140 may consist of one or more servers and/or general purpose computers, each having one or more computer processors associated therewith.

The processing module 140 may have a database 150 communicatively coupled thereto. The database 150 may contain data and information used by the system 100. For example, the database 150 may store account data for financial institution account holders. Additional information maybe contained therein related to the operation and administration of the system 100. The database 150 may include any suitable data structure to maintain the information and allow access and retrieval of the information. For example, the database may keep the data in an organized fashion. The database 150 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein.

The database 150 may be stored in any suitable storage device. The storage device may include multiple data storage devices. The multiple data storage devices may be operatively associated with the database 150. The storage may be local, remote, or a combination thereof with respect to the database. The database 150 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database may have back-up capability built-in. Communications with the database 150 may be over a network, such as the network 135, or communications may be over a direct connection between the database 150 and the processing module 140, as depicted in FIG. 1. Data may be transmitted and/or received from the database 150. Data transmission and receipt may utilize cabled network or telecom connections such as an Ethernet RJ15/Category 5 Ethernet connection, a fiber connection, a traditional phone wireline connection, a cable connection or other wired network connection. A wireless network may be used for the transmission and receipt of data.

The system 100 may have other systems 160 associated therewith. These other systems 160 may include various data collection and support systems used by the financial institution to carry out a variety of functions.

The system 100 may include a portable electronic device or mobile device 170. The portable electronic device 170 may be more than one portable electronic device. The portable electronic device 170 may be associated with a customer. The customer may interact with the portable electronic device through various input means (not shown). For example, the portable electronic device 170 may have a display screen to convey information to the customer. The display may be a color display. For example, the display may be a Liquid Crystal Display ("LCD"). The portable electronic device 170 may have one or more input devices associated with it. For example, the portable electronic device 170 may have an alpha-numeric keyboard, either physical or virtual, for receiving input. The portable electronic device 170 may have a QWERTY style keyboard, either physical or virtual. The portable electronic device 170 may have a pointing device associated therewith, such as, for example, a trackball or track wheel. As described above, the portable electronic device 170 may have communication capabilities over both cellular and wireless type networks to transmit/receive data and/or voice communications.

The portable electronic device 170, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/ or systems suitable for transmitting and receiving data from the portable electronic device. The portable electronic device may use standard wireless protocols which may include IEEE 802.11a, 802.11b, 802.11g, and 802.11n. Such portable electronic devices may be Global Positioning System (GPS) capable. GPS is a satellite based system which sends a signal allowing a device to define its approximate position in a coordinate system on the earth. That is, the portable electronic device may receive satellite positioning data and display the location on the earth of the portable electronic device using GPS. Other location systems may be used. The portable electronic device 170 may include one or more computer processors and be capable of being programmed to execute certain tasks.

The portable electronic device 170 may establish communications with a server 180. Communications may be established over the network 135. Upon successful initiation of communications between the portable electronic device 170 and the server 180, data may be exchanged between the device 170 and the server 180. Data may be transmitted from the portable electronic device 170 to the server 180. Data may be transmitted from the server 180 to the portable electronic device 170.

According to some embodiments, the portable electronic device 170 may interact with the devices 110, 120, or 130. Through the device 110, 120, or 130, the portable electronic device 170 may interact with the server 180 or other parts of the system 100. That is, the device 110, 120, or 130 may serve as an access point to the system 100 for the portable electronic device 170. For example, a user may conduct one or more transactions with the device 110, 120, or 130 using the portable electronic device 170.

It should be appreciated that the server may interact with other parts of the system 100, such as the devices 110, 120, and 130, as well as the processing module 140 and the other systems 160. The server 180 may be a single server or it may be multiple servers. The server 180 may server a variety of roles in the system 100. The server 180 may be communicatively coupled to the processing module 140. In some embodiments, the processing module 140 may be a part of the server 180.

The server 180 may have one or more storage devices associated therewith. The storage may be local, remote, or a combination thereof with respect to the server 180. The storage may utilize a redundant array of disks (RAID), striped disks, hot spare disks, tape, disk, or other computer accessible storage. In one or more embodiments, the storage may be a storage area network (SAN), an Internet small computer systems interface (iSCSI) SAN, a Fiber Channel SAN, a common Internet File System (CIFS), network attached storage (NAS), or a network file system (NFS). The storage may have back-up capability built-in. The back-up capability of the storage may be used to archive image data for later use. The back-up capability may be used for recovery of data in the event of a failure of the storage.

As described above, the containers 190, 192, and 194 may interface or communicatively couple with devices 110, 120, and 130. Each device 110, 120, and 130 may have a receptacle or other interface into which the container 190, 192, or 194 may be inserted into or coupled with.

The containers 190, 192, and 194, while depicted as interfacing with a particular device 110, 120, and 130, may interface with any of devices 110, 120, and 130. Multiple containers may interface with a particular device. The container may be a container for object according to exemplary embodiments. The container may be in a variety of shapes and sizes. For example, the container may be a cash drawer, an envelope, a cartridge, cassette, cylinder, tube, or a box. The container may be referred to as a smart cassette or smart cartridge. The container may be made of a variety of materials. For example, the container may be plastic or metal or composite. The container may be highly resistant to tampering and may have systems to evidence and/or record tampering attempts.

The receptacle of the device 110, 120, and 130 may be configured to mate with or accept the container. In some embodiments, once inserted into the device 110, 120, and 130, the container 190, 192, or 194 may be moved using mechanical, electrical, electronic, or a combination of systems from the insertion point to a point for further processing. In some embodiments, the container may remain at the insertion location for processing. During processing, the contents of the container may be removed, sorted, and counted. For example, cash and coins in the container may be sorted using a cash and coin counter. Following counted, the bills may be banded into set stacks of a particular amount and the coins may be rolled into stacks of particular amounts. In some embodiments, new contents may be inserted into the container as part of a withdrawal transaction. For example, banded bills and rolled coins may be inserted into the container. In some embodiments, the withdrawal may be done with the contents just extracted from the container.

Once the processing is completed, the device 110, 120, and 130 may eject the container 190, 192, or 194.

Each container may have an internal volume. The internal volume may have one or more compartments. For example, the container may have a compartment for cash, a compartment for change, and a compartment for checks.

Each container may have a computing device associated therewith. For example, each container may have a computer processor and computer memory, including both transient and non-transient storage. The computing device may have an input device and a display screen. For example, the input device may be a keypad or a number pad. A selection device may be provided such as a joystick or arrow keys or a touch pad. The computing device may have wireless capability and/or may have input ports to accept a wired connection to a network or other computing device. The computing device may be powered by an internal battery. The battery may be charged when the container is communicatively coupled to a device, such as device 110, 120, or 130.

The container may have a tracking device. For example, the container may have a GPS capability. The tracking device may be included as part of the computing device.

Each container may have a locking system. The locking system may be electronic or mechanical or a combination thereof. For example, the locking system may require an entry of code to unlock and lock the container. In some embodiments, a key may be required. In some embodiments, biometrics may be used.

Figure 2:
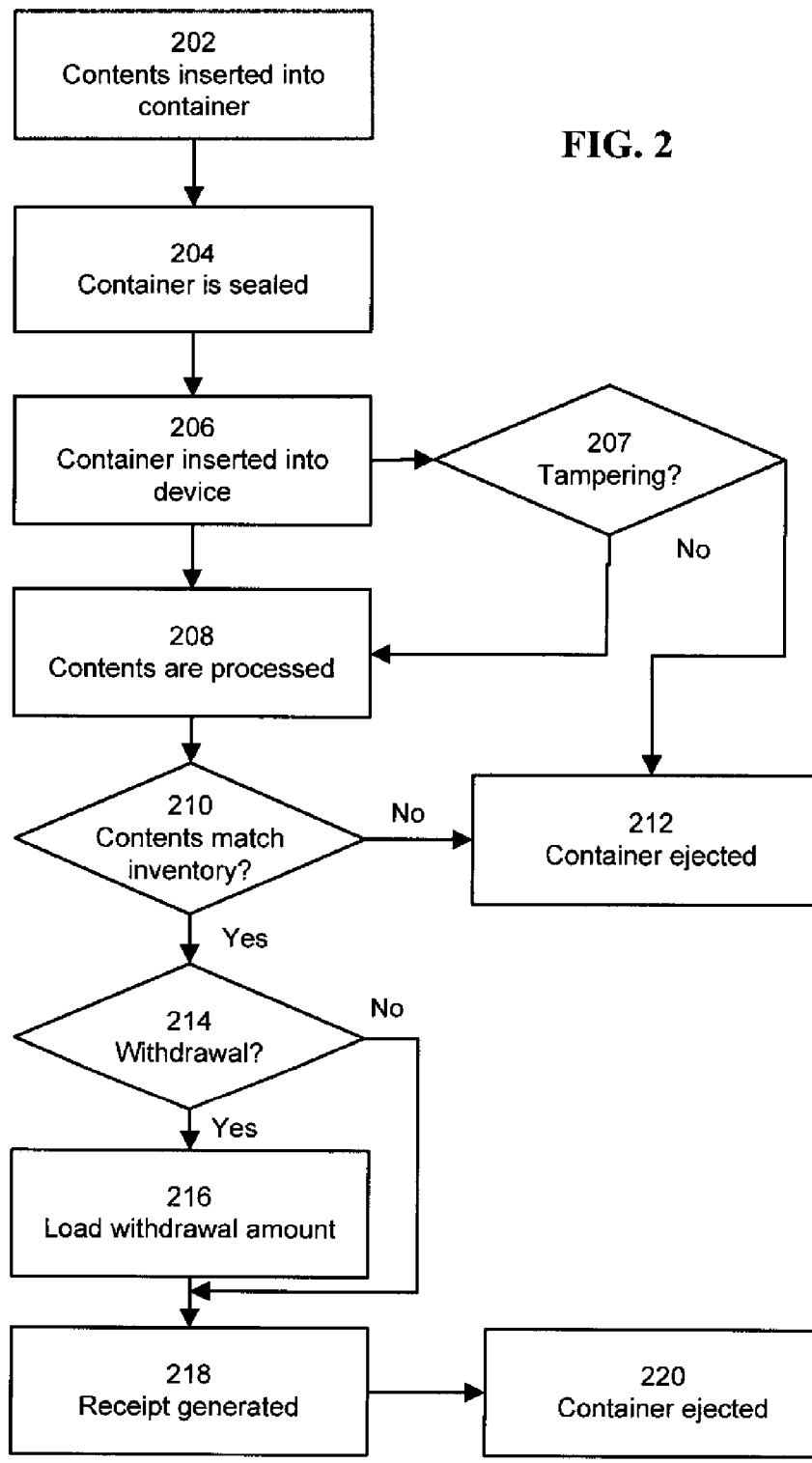
FIG. 2 is a flow chart of a method of using a container with a financial services device in accordance with an exemplary embodiment.

FIG. 2 depicts a flow chart of a method of interfacing with a financial services device according to exemplary embodiments of the invention. Exemplary method 200 is provided by way of example, as there are a variety of ways to carry out the methods disclosed herein. The method 200 as shown in FIG. 2 may be executed or otherwise performed by one or a combination of various systems, such as a computer implemented system.

At block 202, contents are inserted into a container. The container may be a container 190, 192, and/or 194 as described above. The contents may be a combination of cash, coins, and checks. Each different piece of content may be placed into a compartment in the internal volume of the container. The container may be associated with an entity. For example, the entity may be a merchant or business. The contents may be received in the course of daily activity (e.g., business dealings) by the entity. For example, the contents may be payments received in exchange for goods or services by the entity. It should be appreciated that the terms cash and coins may pertain to both United States and foreign currency. The contents may be a combination of both domestic and foreign currency, in some embodiments.

In some embodiments, the container may be located at a financial institution branch or kiosk at a self-service financial services device as described herein. The container may be configured for use by a customer for a personal (or a business) transaction. The customer may approach the device and select a transaction to be conducted at the device. In some embodiments, as described herein, the transaction may be staged in advance using a portable electronic device or other computer. The customer may be presented with the container by the device. Instructions may be conveyed to the customer on how to use the container. The container may have a code or other identifying labels or marks thereon. The customer may be requested to input the container marking code or label marking into the device to pair the customer with the particular container. In some embodiments, the container may have a QR code thereon which the customer may image and then upload the QR code information to the device. The imaging may be performed using a portable electronic device associated with the customer. In other embodiments, the device may automatically associate the container with the customer conducting the transaction internally as part of the processing of the transaction.

In some embodiments, the customer, like a business, may have their own container.

While exemplary embodiments are described with respect to the container having cash, checks, and coins as contents, these embodiments are meant to be exemplary and non-limiting as the container may be used with other contents with the methods described here. For example, the container, in addition to or in place of, may contain food stamps, pharmaceuticals, coupons, used prepaid cards, documents, financial instruments, memory sticks, gems, and precious metals. In these embodiments, the receiving device may be configured to process these types of contents. It should also be appreciated that the device could be configured to dispense similar contents as described below at block 216. These additional contents may be used in place of cash, coins, and checks in any of the embodiments described herein.

At block 204, the container is sealed. The sealing may include locking of the container. The locking may be electronically performed. A code or other entry may be required to lock the container. A key may be used to lock the container. The container may be tamperproof or designed to withstand some amount of forcible entry attempts. The container may container a dye pack or other device that is triggered during an unauthorized entry. The container may record attempts at unauthorized entry using its computer. The container may use biometrics, multi-factor authentication, or other methods to lock (and also open/unlock the container). The container may use both mechanical and electronic/electrical systems for locking/sealing.

As part of the sealing, the container may be programmed. The programming may include entry of information into a computing device associated with the container. For example, the container may have a processor and computer memory along with an input device and a display associated therewith. In some embodiments, the container may be remotely interfaced with through a wireless or wired connection. A second computing device may be communicatively coupled thereto.

The programming may include, but is not limited to, the contents of the device, the destination account number, a withdrawal amount and type of withdrawal, an election of receipt format (electronic, hard copy, email, text, etc.), and an authentication code of the person entering the data. In some embodiments, the container may require input of the merchant's name and other information to identify the contents. In other words, the container may be agnostic and can be used by anyone with an account at the financial institution. In other embodiments, the container may be programmed with that information such that the container is configured for use by a particular merchant or business. In other words, the container may be specified for a particular use. The authentication code may be required to perform entry into the container's programming. Different persons at the entity may have different codes.

The container may have a tracking device associated therewith. The tracking device may be activated upon locking of the container. In some embodiments, the tracking device may be manually actuated.

At block 206, the container is inserted into a device. The device may be a financial services device, a financial services kiosk, or an ATM for example. The device may be located in or near a branch office of a financial institution. The entity inserting the container may have one or more accounts with the financial institution. It should be appreciated that a representative of the entity may insert the container. In some embodiments, a third party may be contracted to handle the container and perform the transaction for the entity.

The device may be located at a location of the entity. For example, the device may be located at the entity's place of business. For example, the financial institution may have an agreement with the entity to allow a financial services kiosk, according to exemplary embodiments, to be located near or within the entity's location. In some embodiments, the device located at the entity may be a specific device to receive the container and may have less functionality than a typical ATM. The device may be located in close proximity to a group of different entities and thus may serve as a common drop point for those entities.

In some embodiments, a plurality of devices may be located in different locations serving as container receipt points or nodes, such as depicted, for example, in the system 100. The devices may be networked with a central system such that each device may be monitored. The device may transmit a signal upon insertion of a container and processing of the contents thereof. The signal may contain details of the transaction. The financial institution or a designated third party representative thereof may periodically service the device and remove its contents (such as collected currency) and replenish the device's contents as well as perform any required service. For example, an armored car company may service the devices to collect the contents. In some embodiments, where there are multiple devices at a location, a robot or other mobile device may be used to service the device and collect the contents.

The device may have a slot or other input area to accept the container. The container may be inserted in a particular way into the device.

As part of the insertion, an authentication may be required. The person or user inserting the container may be required to authenticate to the device. In some embodiments, no authentication may be required from the user since the container may contain authentication/identity information itself.

At block 207, in an optional step, after insertion of the container, if the device is unable to open the container or the devices senses that the container has been tampered with, the container may be ejected. The device may make an entry regarding the discrepancy. This inspection may occur during the processing of the container. The inspection may occur prior to removing the contents of the container for processing below. An electronic notification may be sent to a designated representative of the account holder following this ejection.

In other embodiments, the device may experience a fault or error in processing the container due to a fault in the device's own system. The device may eject the container if it is unable to be processed because of a fault or error in processing the container. The device may transmit a fault or error code to another location indicating the device's problem. Troubleshooting may be performed remotely on the device.

At block 208, the contents of the container are processed. The processing may involve the device unlocking and opening the container. The contents may be extracted by the device. For example, the cash may be extracted from its compartment and counted (in some embodiments, the serial numbers of the cash may be read) and banded/strapped; the change may be extracted from its compartment and counted and rolled; and the checks may be extracted from their compartment and imaged. Foreign currency may be separated from domestic currency (i.e., United States currency may be separated from foreign currency). Other contents may be processed accordingly based on the item type.

The device may interface or communicatively couple with the container. The programming may be read. The device may send an electronic notification that the container has been inserted and is being processed. The electronic notification may be sent to a designated representative of the merchant or account holder. The electronic notification may be sent in a variety of formats including email and text message. In some embodiments, the device, as part of the processing, may communicate with the financial institution. The communication may be electronic and may be over a computer network. The communication may be with a location of the financial institution remote from the device. For example, the device may notify the financial institution that a particular container is being processed. The device may notify the financial institution of the status and the results of the processing. The communication may be with a computer server associated with the financial institution. In order to provide this status and reporting of the processing, the device may be capable of imaging and otherwise recording the processed contents for reporting.

In some embodiments, as part of the processing, currency and coins may be recycled by the device or marked for recycling.

In some embodiments, the device may be able to destroy and produce currency and/or financial instruments. For example, as part of the processing, the device may report the processing status and results to the financial institution and then destroy the contents of the container. In other embodiments, the device may report the processing and then store the contents for later disposition. In other embodiments, the device may be capable of producing currency and/or financial instruments. For example, the device may be able to print currency and/or financial instruments. The device may be programmed with logic to calculate its printing/production requirements. For example, converting the device may have too many 100's of a currency or financial instrument; 20's may be needed. Accordingly, the device may destroy an amount of the 100's and then produce a number of the needed 20's. These embodiments may make the device a self-sufficient and sustaining device to support its merchants and/or customers.

The processing may occur locally at the device. In some embodiments, the device may send or transport the container to another location for processing.

At block 210, the processed contents are compared to an inventory for a match. The inventory may be stored in the container. For example, the processed contents may be compared to the entry in the container's programming to ensure a match; the inventory being stored in the computer associated with the container. In some embodiments, the inventory may be separate from the container. For example, the inventory may be entered into the device along with the container. The inventory may be electronically entered into the device through an entry mechanism such as a keypad or keyboard or touchscreen. In some embodiments, the inventory may be transmitted separately from the container and may be submitted to the device prior to insertion of the container. For example, the inventory may be electronically transmitted from a computing device to the device or the financial institution. The inventory may be emailed or otherwise conveyed to the device or the financial institution.

The inventory may contain an itemized listing of the contents of the container.

At block 212, if the contents do not match the specified deposit, the device may return the contents to the container, reseal, and relock the container or allow the transaction to continue based on a predetermined preference. The device may interface with the container and make an entry regarding the discrepancy. The container may be ejected from the device and the transaction ended. In some embodiments, the processing may continue with a note being made of the lack of match. In some embodiments, the account owner may specify how to handle such situations. For example, preferences may be configured regarding different situations and how such situations are handled.

For example, if the contents of the container are short as compared to the inventory, the entity may specify that the container is ejected without further processing. If the container contents are over the inventory, then the container may be processed with an annotation on the receipt of the overage. In some embodiments, the device may provide the user the option of choosing how to proceed with the transaction. In other embodiments, a message, such as an electronic message, may be sent to the account owner or a designated representative of the entity. It should be appreciated that this person may be different from the person performing the transaction. The message may contain a link or other instructions to allow a remote action to take place as to the disposition of the container.

At block 214, if the contents match or the preference is set to continue the processing, the device may check if a withdrawal is requested.

At block 216, if there is a withdrawal, the appropriate amount may be dispensed or loaded into the container. The withdrawal amount may be put into a specific compartment. The withdrawal compartment may be separate from the deposit compartment in some embodiments.

The withdrawal, according to some embodiments, may be entered into the container. In other embodiments, the withdrawal may be pre-staged with the device. For example, the withdrawal may be entered into the device before or during the container insertion. The withdrawal may be remotely entered into the device using a wireless communication from a computing device. In other embodiments, the withdrawal may be entered into the container either remotely or directly.

In some embodiments, the device may print currency. For example, bills may be printed for dispensing to fulfill an order request. In other embodiments, certificates of deposit, bearer bonds, promissory notes, checks, cheques, or other negotiable instruments may be dispensed as part of the withdrawal. These may be specified on the withdrawal request. In some embodiments, negotiable instruments other than currency may be dispensed due to a shortage of bills in the device.

As described above, the device may dispense food stamps, coupons, prepaid cards, documents, financial instruments, memory sticks, gems, and precious metals.

At block 218, a receipt is generated. The device may provide a receipt. The receipt may be placed into the container. The receipt may be provided electronically to a designated address or phone number of a designated representative of the account holder. For example, an email or text message may be sent containing the receipt. In some embodiments, the receipt may be printed by the device. In some embodiments, any shortages or overages may be noted on the receipt.

At block 220, the container is ejected. The container may be ejected from the device, once it is sealed.

Figure 3A:
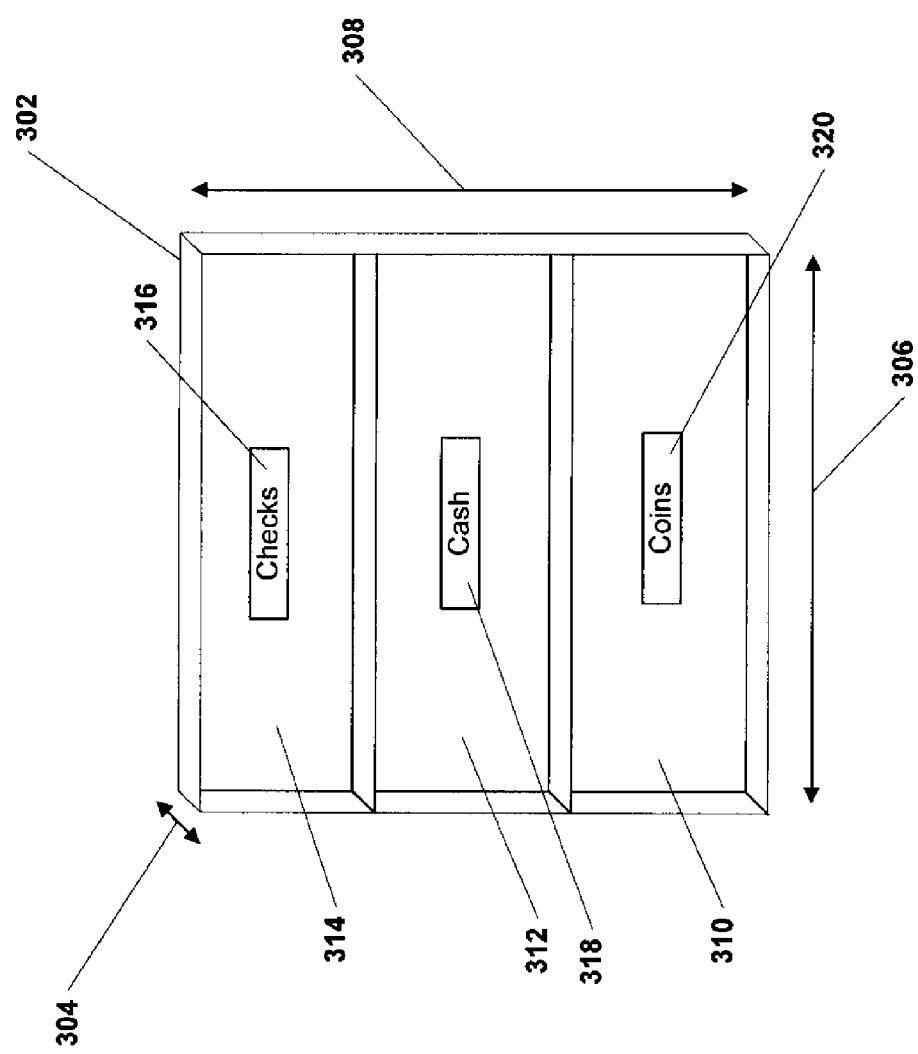
FIG. 3A depicts an internal view of a container in accordance with an exemplary embodiment.

FIG. 3A depicts an internal view of container in accordance with an exemplary embodiment. The container 302 is meant to be exemplary and non-limiting. The container 302 may have a set of dimensions. The dimensions may include a depth 304, a width 306, and a height 308. The depth, width, and height provide a three dimensional volume. The volume may be used to accommodate objects such as cash, currency, and or checks. Accordingly, the dimensions may be sized to accommodate those objects. It should be appreciated that in other applications, the dimensions may be altered to accommodate the objects contained therein. Furthermore, the volume may be sized to accommodate the needs of the user. For example, a large business may have large deposits requiring a container than can hold large sums of cash and coins. Conversely, a smaller merchant may need a smaller container since the smaller merchant has less business volume.

The internal volume of the container may have three sections or compartments 310, 312, and 314. It should be appreciated that more or less internal compartments may be present. Each compartment may have a specific use. The compartments may be labeled, as shown at 316, 318, and 320. For example, the labels may be "Checks," "Cash," and "Coins." It should be appreciated that the labels are exemplary and non-limiting as the container may have a variety of possible contents. Each set of contents may be located in its own compartment. Furthermore, the container may have more or less than three compartments. The contents may be stacked in each compartment in a vertical direction. The coins may be loose or may be in rolls. In exemplary embodiments, any withdrawal amounts may be placed in the corresponding compartment by the device.

Figure 3B:
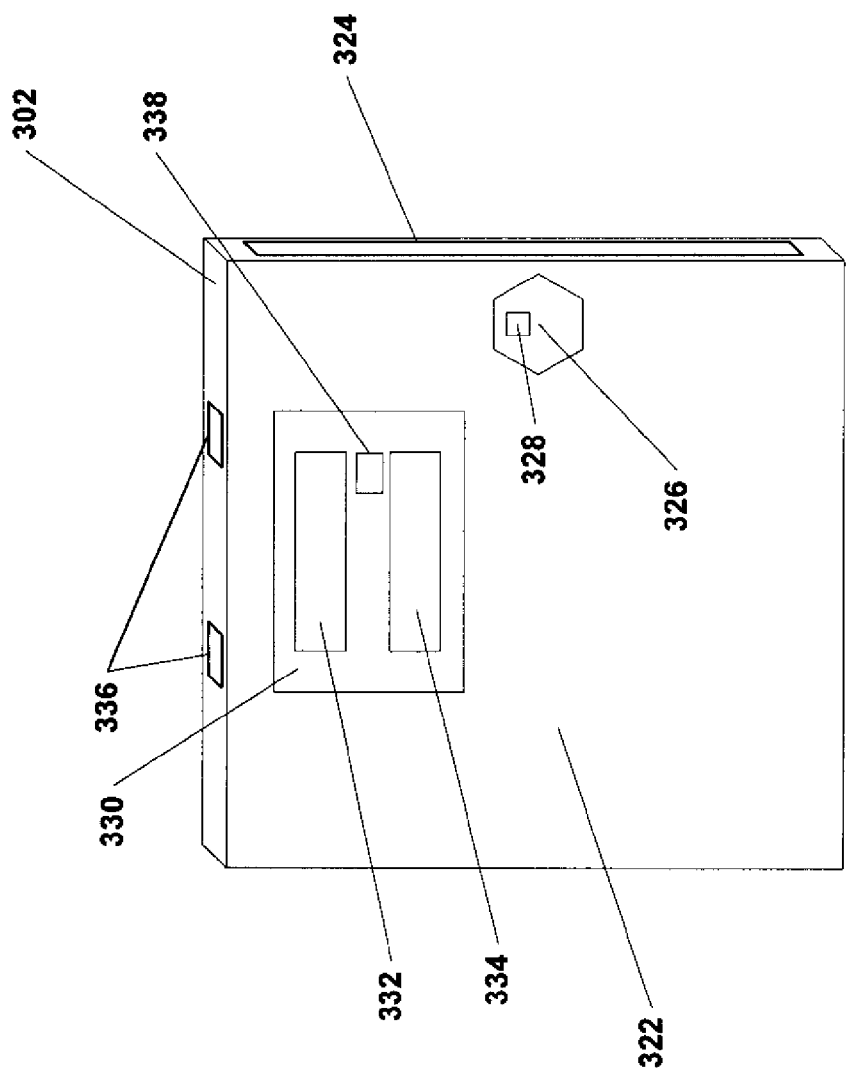
FIG. 3B depicts an external view of a container in accordance with an exemplary embodiment.

The container 302 is shown in an open state with the internal volume exposed. FIG. 3B depicts an external view of container in accordance with an exemplary embodiment. The container 302 is depicted in a closed state. A cover 322 may enclose the internal volume. FIG. 3A is depicted with the cover 322 completely removed. The cover 322 may be a door or other covering that secures onto the container 302. Accordingly, the cover 322 may be attached in a movable and/or removable manner to the container 302. For example, the cover 322 may hinge or slide to open. The cover may have one or more see through portions to enable viewing of the contents.

In some embodiments, another access may be provided to the container 302 to facilitate use in the device to interact with the container 302. For example, a side access port or ports 324 may be provided. There may be a side access port 324 on each side (in FIG. 3B only the one side is visible). This side access 324 may be used by the device to access the internal volume. This side access 324 may be secured in such a manner that a user cannot access and it is machine accessible only. For example, the side access may be mechanically and electronically secured and interfaced such that a machine is required to access. It should be appreciated that the side access port(s) 324 may be optional as the device may access the container 302 through the cover 322. In some embodiments, the cover 322 may have one or more access ports for use by the device (not shown).

A locking mechanism 326 may secure the cover 322. The locking mechanism 326 may be mechanical or electronic or electrical or a combination thereof. The locking mechanism 326 may use biometrics. The locking mechanism 326 may have an input device 328 associated therewith for entry of a code or biometric identifier. The locking mechanism 326 may be tamperproof.

The container 302 may have a computing device 330 integrally configured therewith. The computing device 330 may have a display 332 and an entry section 334.

A set of contacts 336 may provide for interface with the device. The contacts 336 are exemplary and non-limiting as there are other positions and contact types that may be used to interface with the device.

As part of the computing device 330 there may be a tracking device 338. The tracking device 338 may record movement and position of the container 302. The tracking device 338 may be a Global Positioning System (GPS) device. The tracking device 338 may be internal to the computing device 330. In some embodiments, the tracking device 338 may be interfaced with by a user through the computing device 330.

The container 302 may be made from a variety of materials, including plastics, metals, alloys, composites, and combinations thereof. For example, the container 302 may be a combination of plastic and a lightweight metal or composite, such as aluminum or steel or carbon fiber. Kevlar may be used for reinforcing the container 302 for security. The container 302 may be waterproof and/or fireproof. The container 302 may contain a dye pack or other mechanism to deter unauthorized access to the contents.

Figure 4:
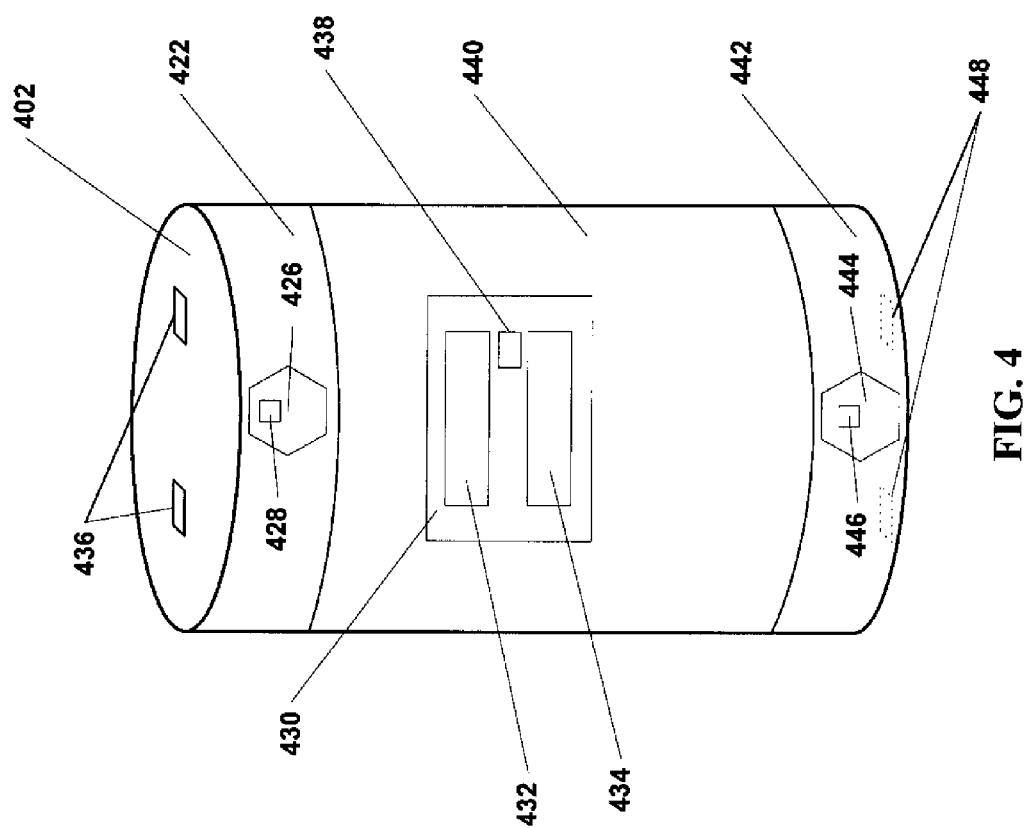
FIG. 4 depicts an external view of a container in accordance with an exemplary embodiment.

FIG. 4 depicts an external view of container in accordance with an exemplary embodiment. The container 402 may be a cylinder as depicted. The container 402 may be used as part of a tube system for performing transactions. A financial institution may have a location with one or more tube receptacles. The container 402 may be placed into one of these receptacles. The receptacle may have contacts for interfacing with the container 402. The container 402 may then be transported to a location, internal to the receptacle, for opening and processing of its contents. The transport may be pneumatic, electronic, magnetic, or other systems. The receptacles may be located at a branch of the financial institution. In some embodiments, the receptacles may be part of a financial services device, such as an ATM.

Each business or entity may have series of containers 402. Once dropped off for processing, the particular container 402 may be kept by the financial institution. A replacement container may be picked up following the drop off. Once processed, the container 402 may be returned to the business or entity. A message may be transmitted indicating the container is ready. In some embodiments, the container may be specific to a particular entity. In other embodiments, the container may be accepted, processed, and returned in a single transaction.

In some embodiments, the container 402 may be used by a customer at a drive through or other self-service location. The container may be provided by a financial transaction device for the customer to insert a deposit into. The deposit may consist of a combination of cash, coins, and checks. The customer may load the container, reseal the container, and insert the container into the financial transaction device. The contents of the container may be processed as described above. A receipt may be provided. The customer may specify a withdrawal. The contents of the desired withdrawal may be inserted into the container and returned to the customer. The process may be entirely automated.

The container 402 may be manually or automatically processed. The container 402 may be used to deposit cash, checks, and coins.

According to exemplary embodiments, the container 402 may have similar characteristics as described for the container 302 above. The cover 422 may be a covering that secures onto the container 402 at the upper portion of the container body 440. Accordingly, the cover 422 may be attached in a movable and/or removable manner to the container 402. For example, the cover 422 may be a lid configuration. The device may access the container 402 through the cover 422. In some embodiments, the cover 422 may have one or more access ports for use by the device (not shown). For example, the cover 422 may be configured to mate or dock with the device in order to transfer the contents of the container to the device for processing. The device may remove the cover 422 or access the contents through an access port in the cover 422. The device may insert any contents into the container 402 through the cover 422 or directly into the container 402 with the cover removed and then the device may reseal the cover 422 to the container 402.

In some embodiments, another access may be provided to the container 402 to facilitate use in the device to interact with the container 402. In some embodiments, the container 402 may have a bottom portion 442. The bottom portion 442 may be removably attached to the lower or bottom portion of the container body 440. For example, the bottom portion 442 may be a lid in the same manner as the cover 422. The device may access the container 402 through the cover 442. For example, the bottom portion 442 may be configured to mate or dock with the device in order to transfer the contents of the container to the device for processing. The device may remove the bottom portion 442 or access the contents through an access port in the bottom portion 442. The device may insert any contents into the container 402 through the bottom portion 442 or directly into the container 402 with the bottom portion removed and then the device may reseal the bottom portion 442 to the container 402. In some embodiments, the device may access the container body 440 (and hence the contents of the container 402) through both the bottom portion 442 and the cover 422.

A locking mechanism 426 may secure the cover 422. The locking mechanism 426 may be mechanical or electronic or electrical or a combination thereof. The locking mechanism 426 may use biometrics. The locking mechanism 426 may have an input device 428 associated therewith for entry of a code or biometric identifier. The locking mechanism 426 may be tamperproof.

In a similar manner, the bottom portion 442 may have a locking mechanism 444 with an input device 446. These may be similar to the locking mechanism 426 and the input device 428 described above. In some embodiments, the locking mechanism 444 and the input device 446 may be different in configuration than the locking mechanism 426 and the input device 428. The bottom portion 442 may be accessed by different entities than the cover 422. For example, the device and the financial institution may be able to access both the cover 422 and the bottom portion 442 through their respective locking mechanisms while a customer or merchant may only be able to access the cover 422.

The container 402 may have a computing device 430 integrally configured therewith. The computing device 430 may have a display 432 and an entry section 434.

A set of contacts 436 may provide for interface with the device. The contacts 436 are exemplary and non-limiting as there are other positions and contact types that may be used to interface with the device. A similar set of contacts 448 may be located on the bottom portion (shown in dashed lines in FIG. 4).

As part of the computing device 430 there may be a tracking device 438. The tracking device 438 may record movement and position of the container 402. The tracking device 438 may be a Global Positioning System (GPS) device. The tracking device 438 may be internal to the computing device 430. In some embodiments, the tracking device 438 may be interfaced with by a user through the computing device 430.

The container 402 may be made from a variety of materials, including plastics, metals, alloys, composites, and combinations thereof. For example, the container 402 may be a combination of plastic and a lightweight metal or composite, such as aluminum or steel or carbon fiber. Kevlar may be used for reinforcing the container 402 for security. The container 402 may be waterproof and/or fireproof. The container 402 may contain a dye pack or other mechanism to deter unauthorized access to the contents. The container body 440 may be transparent to enable observation of the contents from external to the container. The cover 422 and the bottom portion 442 may be made of different materials than the body 440 and in exemplary embodiments may be opaque. In some embodiments, the container body 440 may be opaque. The container 402 may be color coded or have labels with identifying marks or codes to enable one container to be distinguished from another container. The container 402 may be electronically tagged.

Figure 5A:
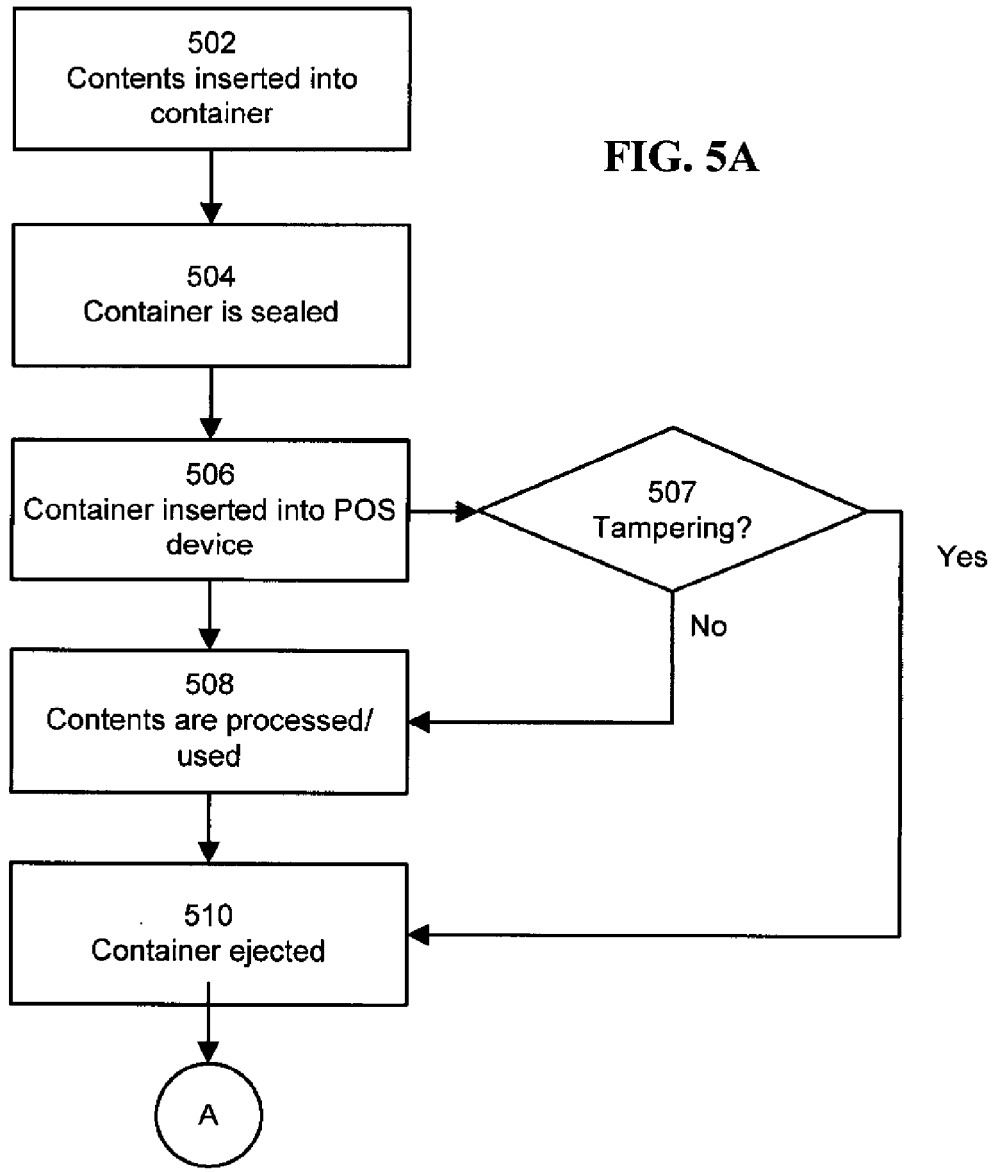
FIGS. 5A and 5B are a flow chart of a method of using a container by a business in accordance with an exemplary embodiment.
Figure 5B:
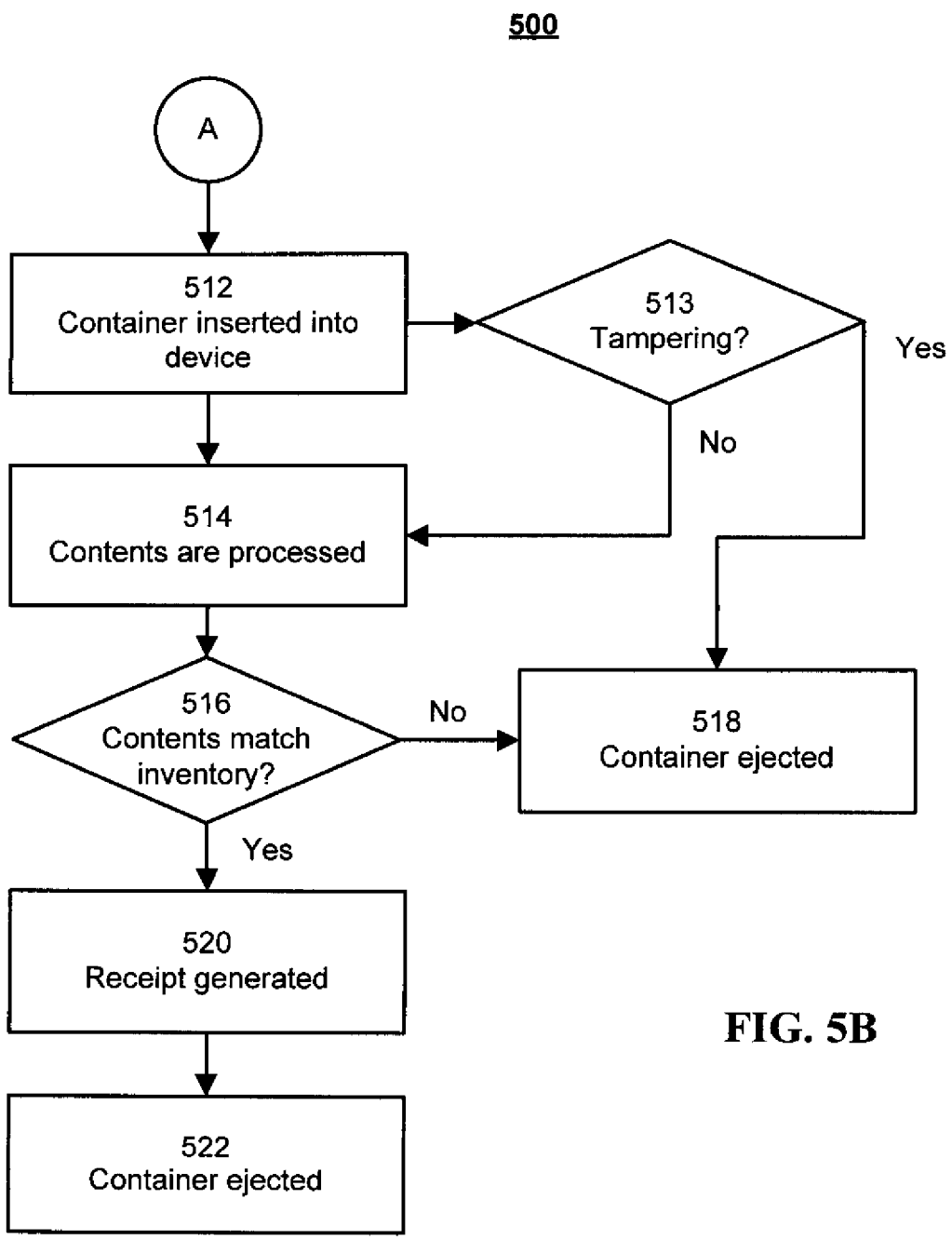

FIGS. 5A and 5B depict a flow chart of a method of interfacing with a financial services device according to exemplary embodiments of the invention. Exemplary method 500 is provided by way of example, as there are a variety of ways to carry out the methods disclosed herein. The method 500 as shown in FIG. 5 may be executed or otherwise performed by one or a combination of various systems, such as a computer implemented system.

At block 502, contents are inserted into a container. The container may be a container 190, 192, and/or 194 as described above. The container may be a cash drawer configured to interface with a point of sale device. The contents may be a combination of cash and coins. The cash may be banded/strapped or loose or a combination thereof. The coins may be rolled or loose or a combination thereof. Each different piece of content may be placed into a compartment in the internal volume of the container. The container may be associated with an entity. For example, the entity may be a merchant or business. The contents may be inserted by a device according to exemplary embodiments. The contents may be inserted into the container for use by an employee of the entity in their daily course of business during the employee's shift. The amount of the contents may be predetermined. In some embodiments, the employee may specify the amount of the contents.

The device may be a financial services device or a financial services kiosk or a transaction device. The device may be located at a location of the entity. For example, the device may be located at the entity's place of business. For example, the financial institution may have an agreement with the entity to allow the device, according to exemplary embodiments, to be located within the entity's location.

In some embodiments, a plurality of devices may be located in different locations serving as container receipt points or nodes at the entity, such as depicted, for example, in the system 100. The devices may be networked with a central system such that each device may be monitored. The device may transmit a signal upon insertion of a container and processing of the contents thereof. The signal may contain details of the transaction. The financial institution or a designated third party representative thereof may periodically service the device and remove its contents (such as collected currency) and replenish the device's contents as well as perform any required service. For example, an armored car company may service the devices to collect the contents. In some embodiments, where there are multiple devices at a location, a robot or other mobile device may be used to service the device and collect the contents. The location may have a central device and a series of satellite devices. The central device may serve as the server side and the satellite devices may be the client side.

The device may have a slot or other input area to accept the container. The container may be inserted in a particular way into the device.

As part of the insertion, an authentication may be required. The person or user inserting the container or desired to use the container may be required to authenticate to the device. In some embodiments, no authentication may be required from the user since the container may contain authentication/identity information itself.

It should be appreciated that the terms cash and coins may pertain to both United States and foreign currency. The contents may be a combination of both domestic and foreign currency, in some embodiments.

While exemplary embodiments are described with respect to the container having cash and coins as contents, these embodiments are meant to be exemplary and non-limiting as the container may be used with other contents with the methods described here. For example, the container, in addition to or in place of, may contain food stamps, coupons, prepaid cards, documents, financial instruments, memory sticks, gems, and precious metals. The contents may be determined by the type of entity and the needs during the course of business.

At block 504, the container is sealed. The sealing may include locking of the container. The locking may be electronically performed by the device. The locking may involve a code or biometrics that is associated with the employee so that only that employee (or their supervisor(s) may unlock the container). The container may be tamperproof or designed to withstand some amount of forcible entry attempts. The container may container a dye pack or other device that is triggered during an unauthorized entry. The container may record attempts at unauthorized entry using its computer. The container may use multi-factor authentication, or other methods to lock (and also open/unlock the container). The container may use both mechanical and electronic/electrical systems for locking/sealing.

As part of the sealing, the container may be programmed. The programming may include entry of information into a computing device associated with the container. For example, the container may have a processor and computer memory along with an input device and a display associated therewith. In some embodiments, the container may be remotely interfaced with through a wireless or wired connection. A second computing device may be communicatively coupled thereto.

The programming may include, but is not limited to, the contents of the device, the destination, and an authentication code of the employee.

The container may have a tracking device associated therewith. The tracking device may be activated upon locking of the container. In some embodiments, the tracking device may be manually actuated.

At block 506, the container is inserted into a point of sale (POS) device. The container may be inserted by the employee. The POS device may interface with the container.

At block 507, in an optional step, after insertion of the container, if the POS device is unable to open the container or the devices senses that the container has been tampered with, the container may be ejected. The POS device may make an entry regarding the discrepancy. This inspection may occur during the processing of the container. The inspection may occur prior to removing the contents of the container as described above at block 506.

In other embodiments, the POS device may experience a fault or error in processing the container due to a fault in the POS device's own system. The POS device may eject the container if it is unable to be processed because of a fault or error in processing the container. The POS device may transmit a fault or error code to another location indicating the device's problem. Troubleshooting may be performed remotely on the POS device.

At block 508, the contents of the container are extracted. The contents may be inventoried and then distributed for use by the POS device. For example, the contents may be distributed to a cash drawer by the POS device. In some embodiments, the container may serve as the cash drawer. The processing may involve the POS device unlocking and opening the container. For example, the cash may be extracted from its compartment; the change may be extracted from its compartment. The POS device may compare the contents with the inventory programmed into the container. In the event of a discrepancy, the POS device may alert the employee and/or eject the container.

The POS device may interface or communicatively couple with the container. The POS device may send an electronic notification that the container has been inserted. The electronic notification may be sent in a variety of formats including email and text message.

At block 510, the container is ejected from the POS device. The container may be ejected following the end of the business day or the employee's shift. In some embodiments, the container may be ejected once it is full since the container has a finite volume. The POS device may load and seal/lock the container. The POS device may record the contents of the container such as the amount of cash, coins, checks, and/or other items present in the container. This may be the inventory of the container. The contents may be monies earned during the business day.

At block 512, the container is inserted into the device. The device may the same device described above at block 502. As part of the insertion, an authentication may be required. The employee inserting the container may be required to authenticate to the device. In some embodiments, no authentication may be required from the employee since the container may contain authentication/identity information itself.

At block 513, in an optional step, after insertion of the container, if the device is unable to open the container or the devices senses that the container has been tampered with, the container may be ejected. The device may make an entry regarding the discrepancy. This inspection may occur during the processing of the container. The inspection may occur prior to removing the contents of the container for processing below.

In other embodiments, the device may experience a fault or error in processing the container due to a fault in the device's own system. The device may eject the container if it is unable to be processed because of a fault or error in processing the container. The device may transmit a fault or error code to another location indicating the device's problem. Troubleshooting may be performed remotely on the device.

At block 514, the contents of the container are processed. The processing may involve the device unlocking and opening the container. The contents may be extracted by the device. For example, the cash may be extracted from its compartment and counted (in some embodiments, the serial numbers of the cash may be read) and banded/strapped; the change may be extracted from its compartment and counted and rolled; and the checks may be extracted from their compartment and imaged. Checks may be in the container as a result of receipt in the course of business. Foreign currency may be separated from domestic currency (i.e., United States currency may be separated from foreign currency). Other contents may be processed accordingly based on the item type. The contents may be stored in the device. In this manner, the device may serve as a safe for storing the contents for the entity.

At block 516, the processed contents are compared to the inventory for a match. For example, the processed contents may be compared to the entry in the container's programming to ensure a match; the inventory being stored in the computer associated with the container. The inventory may contain an itemized listing of the contents of the container.

The device may interface or communicatively couple with the container. The programming may be read. The device may send an electronic notification to the merchant that the container has been inserted and is being processed. The electronic notification may be sent in a variety of formats including email and text message. The notification may be sent to a designated representative of the entity, such as a manager, supervisor, accountant, or CFO. Multiple persons may receive the notification.

At block 518, if the contents do not match the specified deposit, the device may return the contents to the container, reseal, and relock the container or allow the transaction to continue based on a predetermined preference. The device may interface with the container and make an entry regarding the discrepancy. The container may be ejected from the device. In some embodiments, the processing may continue with a note being made of the lack of matching. In some embodiments, the rules may specify how to handle such situations. For example, preferences may be configured regarding different situations and how such situations are handled.

For example, if the contents of the container are short as compared to the inventory, the entity may specify that the container is ejected without further processing. If the container contents are over the inventory, then the container may be processed with an annotation on the receipt of the overage. In some embodiments, the device may provide options of choosing how to proceed with the transaction. In other embodiments, a message, such as an electronic message, may be sent to the designated representative of the entity, as described above. It should be appreciated that this person may be different from the person performing the transaction. The message may contain a link or other instructions to allow a remote action to take place as to the disposition of the container.

At block 520, a receipt is generated. The device may provide a receipt. The receipt may be provided electronically to a designated representative of the entity. For example, an email or text message may be sent containing the receipt. The receipt may also be provided to the employee performing the transaction. In some embodiments, the receipt may be printed by the device. In some embodiments, any shortages or overages may be noted on the receipt.

At block 522, the container is ejected. The container may be ejected from the device. The container may now be ready for subsequent use. In some embodiments, the container may be stored in the device. The container may then be reloaded upon a command to do so and then dispensed. In some embodiments, the container is ejected and then stored outside of the device.

The preceding method may be conducted by a third party in place of the employee. As described above, in some embodiments, the containers may be serviced and handled by a third party. The third party may be an armored car company or similar entity. For example, a third party may handle, distribute, collect, and process containers for one or more business locations. The third party may have one or more devices capable of processing the containers. For example, an armored truck or other vehicle may be outfitted with one or more devices to process and handle the containers. In some embodiments, the third party may transport the containers from the business location to the financial institution for processing. In other embodiments, the third party may pick-up and distribute the containers from business locations and handle and process the containers at another location. For example, the third party may have a central receiving site to which containers are processed by one or more devices located at the central receiving site.

In exemplary embodiments, the third party may convey contents processed from containers, such as currency and coins, to the financial institution. The financial institution may provide the third party with currency and coins to load into containers. In some embodiments, the third party may use one or more containers to transfer currency, coins, checks, and other financial instruments to the financial institution. The third party may receive currency and coins in the container.

In certain embodiments, the containers may be capable of communicating with the third party as to the container's status. For example, if the container is full and needs processed, the container may communicate to the third party this status. The third party may then proceed to the container's location to pick-up and process the container. The communication may be over a computer network and/or over a cellular network and/or over a wireless network. Other methods of communication may be used. In some embodiments, the container may communicate through a point of sale device or other device to which the container is interfaced. The container may communicate with the financial institution in a similar manner. The container may communicate with both the financial institution and the third party. In some embodiments, each container may be the property of the financial institution. In other embodiments, the container may be the property of the third party.

Hereinafter, aspects of implementation of the exemplary embodiments will be described. As described above, the method of the invention may be computer implemented as a system. The system of the invention or portions of the system of the invention may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories and the data stores used in the invention may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions. It is also appreciated that the data storage performed by two distinct components as described above may, in accordance with a further embodiment of the invention, be performed by a single component. Further, the data storage performed by one distinct component as described above may be performed by two distinct components.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, C#, COBOL, dBase, Forth, Fortran, Java, Modula-2, Pascal, Prolog, Python, RUM Ruby, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, which enables the computer operating system to perform the operations described above, may be contained on any of a wide variety of computer readable media, as desired. Further, the data for example processed by the set of instructions might also be contained on any of a wide variety of media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

While the embodiments have been particularly shown and described within the framework of financial services devices, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. The specification and examples should be considered exemplary.

What is claimed is:

1. A computer implemented method, comprising:
receiving, by a financial services device, comprising at least one computer processor, a container from a business entity, wherein the container has an internal volume and is configured to hold contents comprising one or more of cash, coins, and checks and the container is received into a receptacle at the financial services device;
extracting, by the financial services device, the contents;
processing, by the financial service device, the contents;
verifying, by the financial services device, the contents of the container with an inventory of the contents; and
ejecting the container by the financial services device upon the contents not matching the inventory.

2. The method of claim 1, wherein the inventory is received electronically and separately from the container.

3. The method of claim 2, wherein the inventory is received prior to the receipt of the container by the financial services device.

4. The method of claim 1, wherein the inventory is stored in the container.

5. The method of claim 4, wherein the container stores the inventory electronically.

6. The method of claim 1, further comprising:
interfacing, by the financial services device, electronically with the container.

7. The method of claim 1, further comprising:
transmitting, electronically, a receipt following the processing of the contents.

8. The method of claim 1, wherein the financial services device is an automated teller machine.

9. The method of claim 1, wherein the financial service device is located at a branch of a financial institution.

10. The method of claim 1, wherein the financial services device is located at a location of the business entity.

11. The method of claim 10, wherein the container is configured for use with a point of sale device at the business entity.

12. The method of claim 1, wherein the financial service device is located proximate to a location of the business entity but separate and apart from a branch of a financial institution.

13. The method of claim 1, further comprising:
receiving, electronically, a withdrawal request for one or more of cash and coins from the business entity; and
inserting the one or more of cash and coins into the container in response to the withdrawal request prior to ejecting the container following processing of the contents.

14. The method of 1, further comprising:
inspecting the container for tampering as part of the processing; and
ejecting the container upon detecting tampering.

15. The method of claim 1, wherein the container comprises at least one of a computer processor, computer memory, a display, and an input device integral to the container.

16. The method of claim 1, wherein the container comprises a tracking system integral to the container.

17. A computer implemented method, comprising:
receiving, by a device, comprising at least one computer processor, a container associated with a business entity, wherein the container has an internal volume and is configured to hold contents comprising a first set of one or more of cash and coins and the container is received into a receptacle at the device and the device is located at a location of the business entity;
inserting one or more of cash and coins into the container in response to the receiving of the container, wherein the first set of one or more of cash and coins comprises an inventory for issuance to an employee for use during a course of business of the business entity;
locking the container following the inserting such that the container is sealed in a tamperproof manner; and
ejecting the container by the device following the locking.

18. The method of claim 17, further comprising:
receiving, by the device, the container, wherein the container has contents comprising a second set of at least one of cash and coins, wherein the second set comprises, at least in part, cash and coins collected by the business entity in the course of business;
extracting, by the device, the contents; and
processing, by the device, the contents.

19. The method of claim 18, further comprising:
ejecting the container by the device following the processing of the contents.

20. The method of claim 18, further comprising:
storing the container by the device following the processing of the contents.

21. The method of claim 17, wherein the container is configured to be inserted into a point of sale device.

22. The method of claim 21, wherein the container serves as a cash drawer for the point of sale device.

23. A computer implemented method, comprising:
receiving, by a financial services device, comprising at least one computer processor, a container from a customer of a financial institution associated with the financial services device, wherein the container has an internal volume and is configured to hold contents comprising one or more of cash, coins, and checks and the container is received into a receptacle at the financial services device and wherein further the container is paired with the customer;
extracting, by the financial services device, the contents;
processing, by the financial service device, the contents;
verifying, by the financial services device, the contents of the container with an inventory of the contents; and
ejecting the container upon the contents not matching the inventory.

24. The method of claim 23, further comprising:
ejecting the container upon completion of the processing.

25. The method of claim 24, further comprising:
receiving, electronically, a withdrawal request for one or more of cash and coins from the customer; and
inserting the one or more of cash and coins into the container in response to the withdrawal request prior to ejecting the container.

26. The method of claim 23, further comprising:
interfacing, by the financial services device, electronically with the container.

27. The method of claim 23, further comprising:
transmitting, electronically, a receipt to the customer following the processing of the contents.

28. The method of claim 23, wherein the financial services device is an automated teller machine.

29. The method of claim 23, wherein the financial service device is located at a branch of the financial institution.

30. The method of claim 23, wherein the financial service device is located separate and apart from a branch of the financial institution.

* * * * *